(12) United States Patent
Mitomo et al.

(10) Patent No.: US 11,444,489 B2
(45) Date of Patent: Sep. 13, 2022

(54) ELECTRONIC APPARATUS, SYSTEM AND METHOD

(71) Applicant: KABUSHIKI KAISHA TOSHIBA, Minato-ku (JP)

(72) Inventors: Toshiya Mitomo, Yokohama (JP); Kentaro Taniguchi, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/563,711

(22) Filed: Sep. 6, 2019

(65) Prior Publication Data
US 2020/0136435 A1    Apr. 30, 2020

(30) Foreign Application Priority Data
Oct. 29, 2018    (JP) .............................. JP2018-202840

(51) Int. Cl.
*H02J 7/02*    (2016.01)
*H02J 50/27*    (2016.01)
(Continued)

(52) U.S. Cl.
CPC .............. *H02J 50/12* (2016.02); *H02J 50/40* (2016.02); *H02J 50/80* (2016.02); *H04B 5/0031* (2013.01); *H04B 5/0037* (2013.01)

(58) Field of Classification Search
CPC .......... H02J 50/12; H02J 50/20; H02J 50/402; H02J 50/40; H02J 50/23; H02J 50/80; H02J 50/60; H04B 5/0031; H04B 5/0037
See application file for complete search history.

(56) References Cited

U.S. PATENT DOCUMENTS

| 10,153,645 | B1* | 12/2018 | Bell | ........................ | H02J 50/12 |
| 2010/0284208 | A1* | 11/2010 | Nguyen | .............. | H02M 7/4807 |
| | | | | | 363/160 |

(Continued)

FOREIGN PATENT DOCUMENTS

JP    5320138 B2    10/2013
JP    2015-72173 A    4/2015
(Continued)

OTHER PUBLICATIONS

Sasakawa, D. et al., "Fast-Living Body Localization Algorithm using MIMO Radar in Indoor Environment," IEICE Technical Report, A P2015-128, Nov. 2015, The Institute of Electronics, Information and Communication Engineers, pp. 105-110 (6 total pages).

*Primary Examiner* — Jared Fureman
*Assistant Examiner* — Esayas G Yeshaw
(74) *Attorney, Agent, or Firm* — Oblon, McClelland, Maier & Neustadt, L.L.P.

(57) ABSTRACT

According to one embodiment, an wireless power transmission apparatus includes a plurality of antennas, a power transmission circuit, a measuring circuit and a control circuit. The power transmission circuit is configured to transmit a beam of a first wireless signal from the plurality of antennas. The measuring circuit is configured to receive a second wireless signal with the plurality of antennas. The control circuit is configured to: detect an object in a direction of the beam based on the second wireless signal received at a plurality of timings; and change a shape of the beam by controlling at least either an amplitude or a phase of the first wireless signal provided to each antenna of the plurality of antennas.

25 Claims, 26 Drawing Sheets

EXAMPLE OF THE SECOND WIRELESS SIGNALS TRANSMITTED FROM THE POWER RECEIVING APPARATUSES (PLAN VIEW)
-THE PLURALITY OF RECEIVING APPARATUSES DO NOT NEED TO TRANSMIT SECOND WIRELESS SIGNALS SIMULTANEOUSLY, AS IN ABOVE

(51) Int. Cl.
    *H02J 50/12*     (2016.01)
    *H02J 50/40*     (2016.01)
    *H04B 5/00*     (2006.01)
    *H02J 50/80*     (2016.01)

(56) References Cited

U.S. PATENT DOCUMENTS

| | | |
|---|---|---|
| 2012/0326660 A1 | 12/2012 | Lu et al. |
| 2014/0285029 A1* | 9/2014 | Ichikawa ............ B60L 15/2009 307/104 |
| 2014/0312702 A1* | 10/2014 | Uchida .................. H02J 50/90 307/80 |
| 2017/0288475 A1 | 10/2017 | Lee et al. |
| 2018/0301937 A1* | 10/2018 | Park ........................ H02J 50/12 |
| 2019/0052114 A1* | 2/2019 | Lee ........................ H02J 50/90 |

FOREIGN PATENT DOCUMENTS

| | | |
|---|---|---|
| JP | 2018-502538 A | 1/2018 |
| JP | 6265761 B2 | 1/2018 |
| JP | 6273546 B2 | 2/2018 |

\* cited by examiner

EXAMPLE OF THE SECOND WIRELESS SIGNALS TRANSMITTED FROM THE POWER RECEIVING APPARATUSES (PLAN VIEW) -THE PLURALITY OF RECEIVING APPARATUSES DO NOT NEED TO TRANSMIT SECOND WIRELESS SIGNALS SIMULTANEOUSLY, AS IN ABOVE

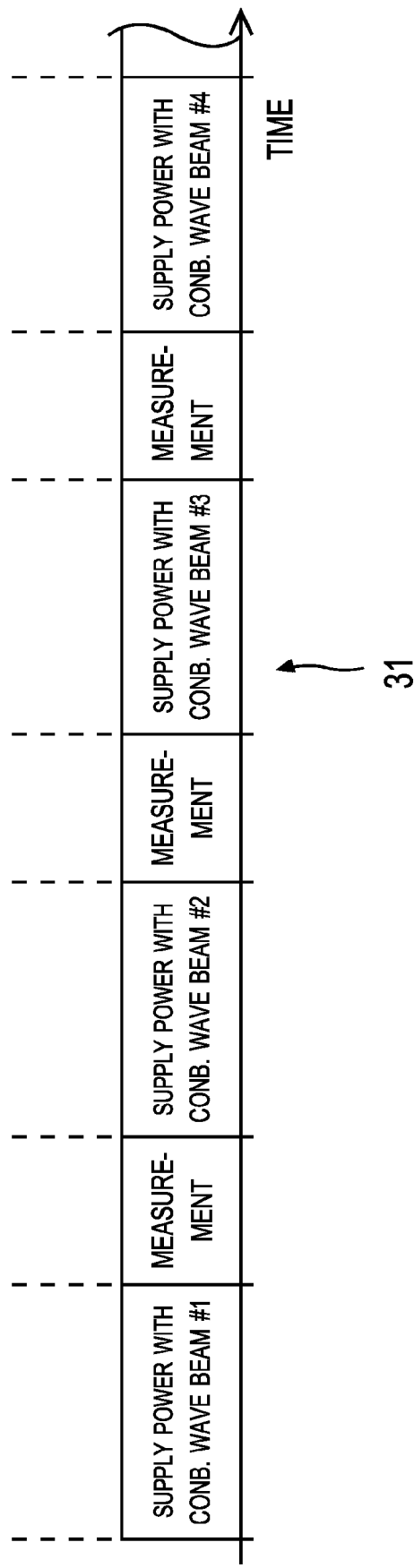
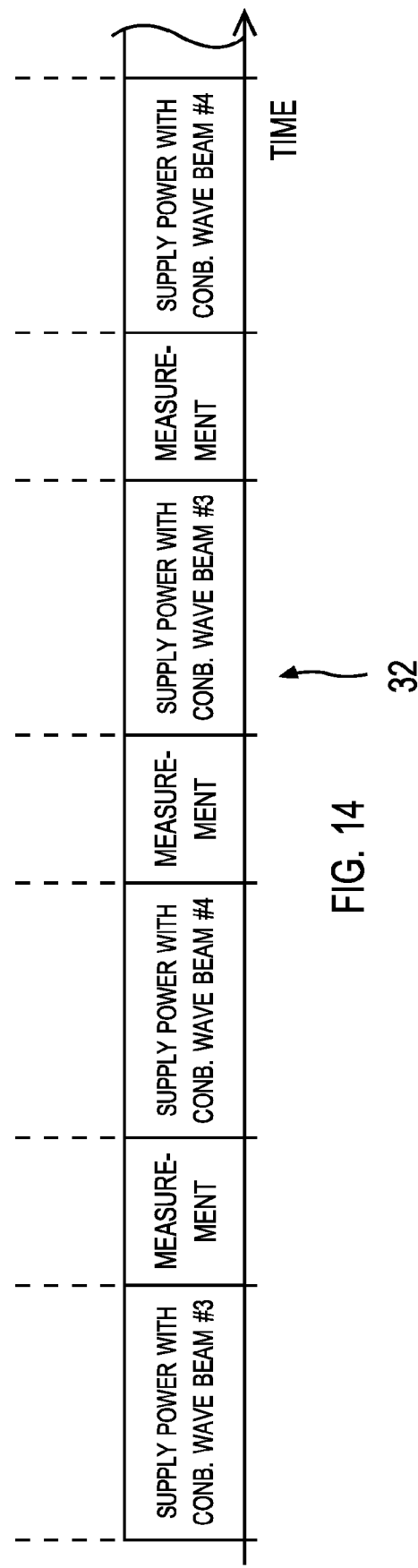
FIG. 14

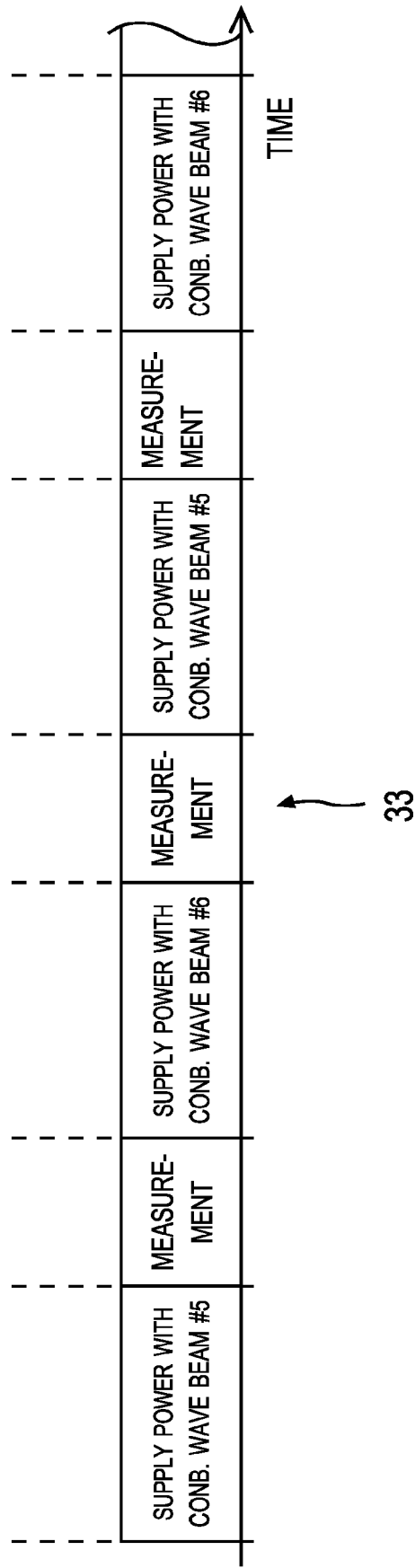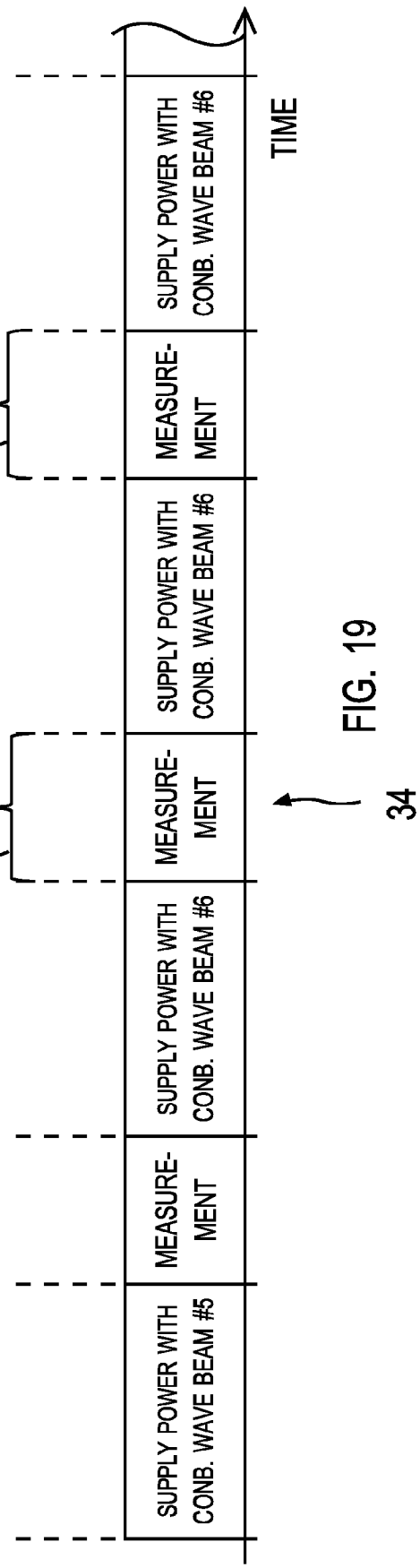
FIG. 19

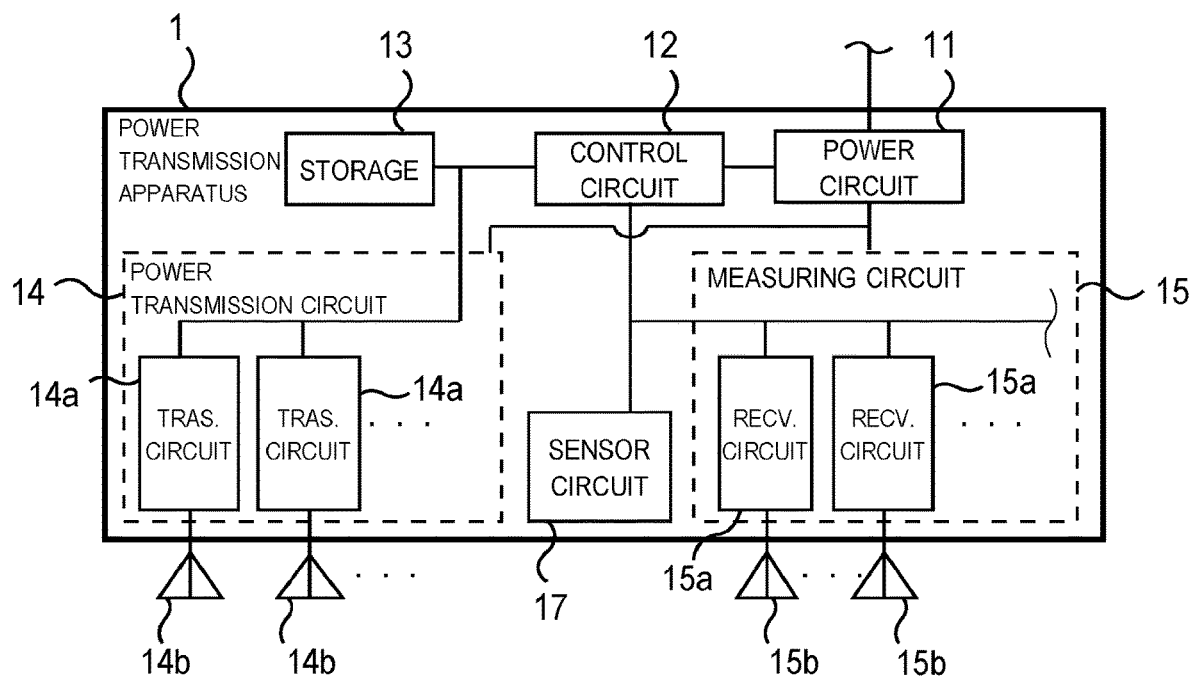
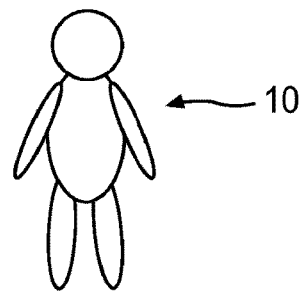
FIG. 25

ELECTRONIC APPARATUS, SYSTEM AND METHOD

CROSS-REFERENCE TO RELATED APPLICATIONS

This application is based upon and claims the benefit of priority from Japanese Patent Application No. 2018-202840, filed on Oct. 29, 2018; the entire contents of which are incorporated herein by reference.

FIELD

Embodiments described herein relate generally to an electronic apparatus, a system and a method.

BACKGROUND

Today, wireless power transmission technology is applied in various fields. However, if wireless power transmission is used, objects within the environment may be exposed to electromagnetic waves. Thus, some measures can be taken to reduce any potential risks. For example, failures and malfunctions of electronic apparatuses may occur when they are exposed to strong electromagnetic waves. Also, exposure to strong electromagnetic waves may affect the human body. In order to alleviate such risks, the electromagnetic field strength within the space can be reduced to values within the range defined in protection guidelines.

If an object exists within the space, transmission of wireless power signal can be halted. However, if the transmission of power signal stops frequently, the receiving side would not receive power efficiently, increasing the time required to charge secondary batteries. It is desired to perform efficient transmission of power, safely.

BRIEF DESCRIPTION OF THE DRAWINGS

FIG. 14 is a timing diagram presenting an example of changing processing steps depending on the detection of a human body;

FIG. 19 is a timing diagram presenting an example of processes executed by the wireless power transmission apparatus according to a third embodiment;

FIG. 25 is a block diagram illustrating an example configuration of a wireless power transmission system according to a fifth embodiment.

DETAILED DESCRIPTION

Figure 1:
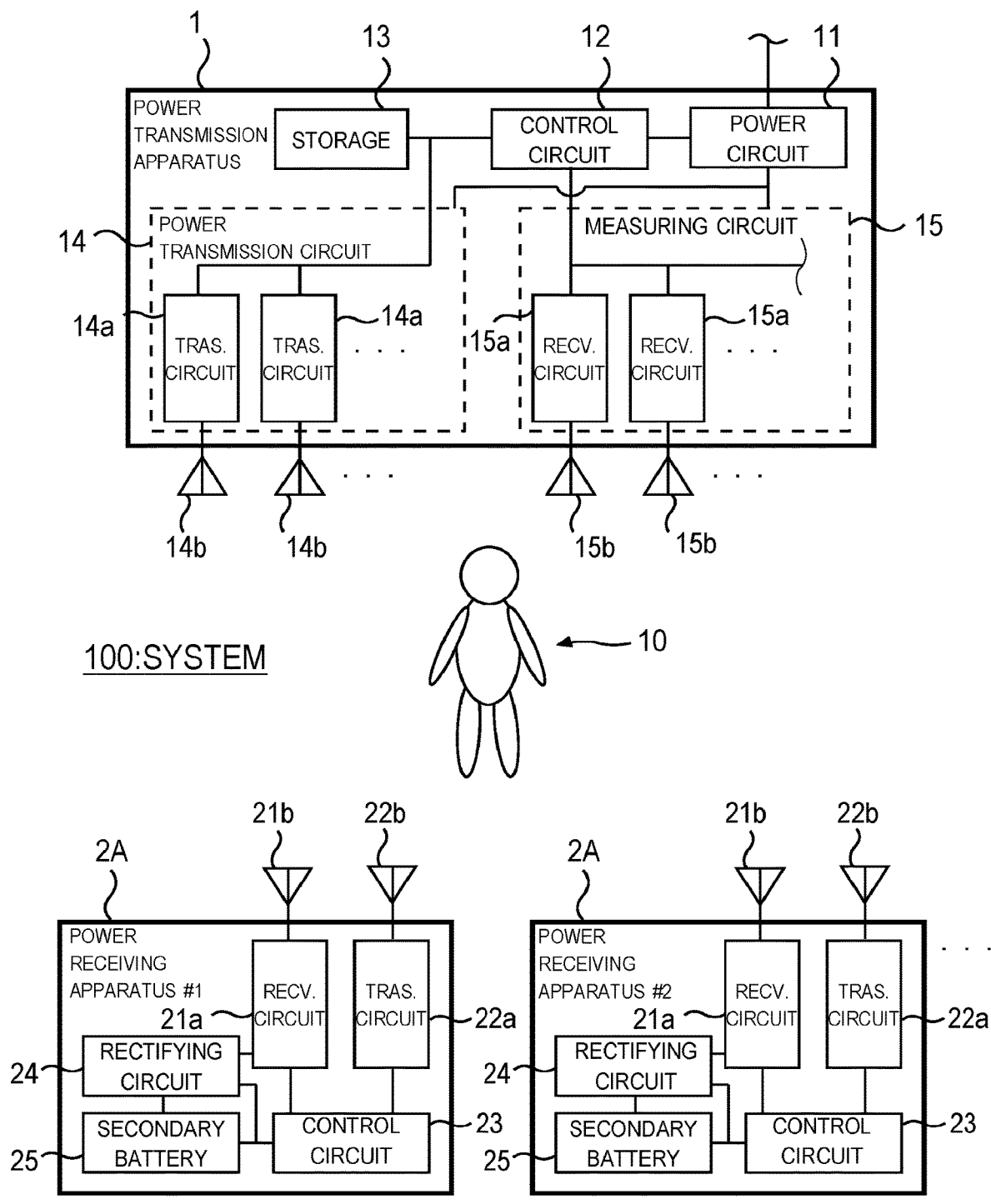
FIG. 1 is a block diagram illustrating an example configuration of a wireless power transmission system.

According to one embodiment, an wireless power transmission apparatus includes a plurality of antennas, a power transmission circuit, a measuring circuit and a control circuit. The power transmission circuit is configured to transmit a beam of a first wireless signal from the plurality of antennas. The measuring circuit is configured to receive a second wireless signal with the plurality of antennas. The control circuit is configured to: detect an object in a direction of the beam based on the second wireless signal received at a plurality of timings; and change a shape of the beam by controlling at least either an amplitude or a phase of the first wireless signal provided to each antenna of the plurality of antennas.

In the following detailed description, for purposes of explanation, numerous specific details are set forth in order to provide a thorough understanding of the embodiments. It will be apparent, however, that one or more embodiments may be practiced without these specific details. In other instances, well-known structures and apparatuses are schematically shown in order to simplify the drawing.

Hereinafter, embodiments of the present invention will be described in reference to the drawings.

First Embodiment

FIG. 1 is a block diagram illustrating an example configuration of a wireless power transmission system (abbreviated as "system" if necessary). The wireless power transmission system (system 100) includes at least one wireless power transmission apparatus (abbreviated as the "electronic apparatus" or the "power transmission apparatus", if necessary) and at least one wireless power receiving apparatus (hereinafter abbreviated as the "power receiving apparatus" within the description). The propagation path of various wireless signals including the wireless signal transmitted by the power transmission apparatus for the sake of supplying power (referred to as the first wireless signal) and the wireless signal transmitted by the power receiving apparatus (referred to as the second wireless signal) will be located in the space between the power transmission apparatus and the power receiving apparatus. However, some objects may intrude into this space where the wireless signals propagate. In the example of FIG. 1, a human body 10 is intruding in the space between the power transmission apparatus and the power receiving apparatus. However, the type of intruding objects is not limited to the human body. For example, intruding objects may be moving bodies such as vehicles and drones. Also, intruding objects may be living organisms such as plants and animals. The intruding objects may be foreign objects such as metal, wood, resin or ceramics. The power transmission apparatus detects the objects intruding into the space by receiving the second wireless signal. If any objects are detected, the power transmission apparatus changes the shape of the beam (combined wave beam) of the first wireless signal transmitted from a plurality of antennas.

The wireless power transmission system in FIG. 1 includes a power transmission apparatus 1, a power receiving apparatus 2A (also referred to as the power receiving apparatus #1) and a power receiving apparatus 2B (also referred to as the power receiving apparatus #2). However, this configuration is only an example. For example, the wireless power transmission system can have a plurality of power transmission apparatuses. Also the number of power receiving apparatuses N can be different from FIG. 1.

The power transmission apparatus 1 is a wireless communication apparatus with an array antenna including a plurality of elements. The power receiving apparatuses 2A and 2B (power receiving apparatuses #1 and #2) are wireless communication apparatuses which receive power from the first wireless signal transmitted from the power transmission apparatus 1.

In the following, the configuration of the power transmission apparatus 1 is described. The power transmission apparatus 1 includes a power circuit 11, a control circuit 12, a storage 13, a power transmission circuit 14 and a measuring circuit 15. The power circuit 11 provides power to other components of the power transmission apparatus 1. The power circuit 11 can convert AC power provided from external power sources to DC power by using rectifiers. Also, the power circuit 11 can boost or buck the power signal by using a DC-DC converter. The control circuit 12 controls other components of the power transmission apparatus 1. The control circuit 12 can include a processor which can execute various instructions of programs. Also, the control circuit 12 can include hardware circuits such as ASIC, FPGA and PLD. The control circuit 12 can read and/or write data in the storage 13. Instructions executed by the control circuit 12, programs executed by the control circuit 12 and data used for the execution of instructions or programs can be stored in the storage 13. Details of the processes executed by the control circuit 12 are described later.

The storage 13 provides storage space which can be used for saving various data. The storage 13 can be volatile memory such as SRAM and DRAM. Also, the storage 13 can be non-volatile memory such as NAND, MRAM and FRAM. The storage 13 can be storage apparatuses such as HDD and SSD. Also, the storage 13 can be external storage apparatuses. Thus, the type of apparatus used as the storage 13 is not limited. Also, the storage 13 can be a combination of a plurality of types of memory apparatuses and storage apparatuses.

The power transmission circuit 14 transmits the beam of the first wireless signal by using a plurality of antennas 14b. The power transmission circuit 14 includes a plurality of transmission circuits 14a. Also, each of the transmission circuits 14a has an antenna 14b. Each transmission circuit 14a transmits wireless signals by using the corresponding antenna 14b. Also, each transmission circuit 14a has a variable phaser and a variable amplifier. By controlling the variable phaser, the control circuit 12 can set the phase of the wireless signal transmitted from the antenna 14b to a desired value. Also, by controlling the variable amplifier, the control circuit 12 can set the amplitude of the wireless signal transmitted from the corresponding antenna 14b to a desired value. Also, based on information of the second wireless signals received at a plurality of timings (hereinafter referred to as the propagation path information), the control circuit 12 can determine the phase and the amplitude of the wireless signals transmitted from each of the antennas 14b, each corresponding to the transmission circuit 14a. The propagation path information can be saved in the storage 13. Information including the phase and the amplitude of the wireless signals transmitted from each of the antennas 14b are called the transmission settings. Examples of the propagation path information include the time domain waveforms of the second wireless signal, amplitudes, phases, frequency domain waveforms, incoming directions and channel matrices.

Figure 2:
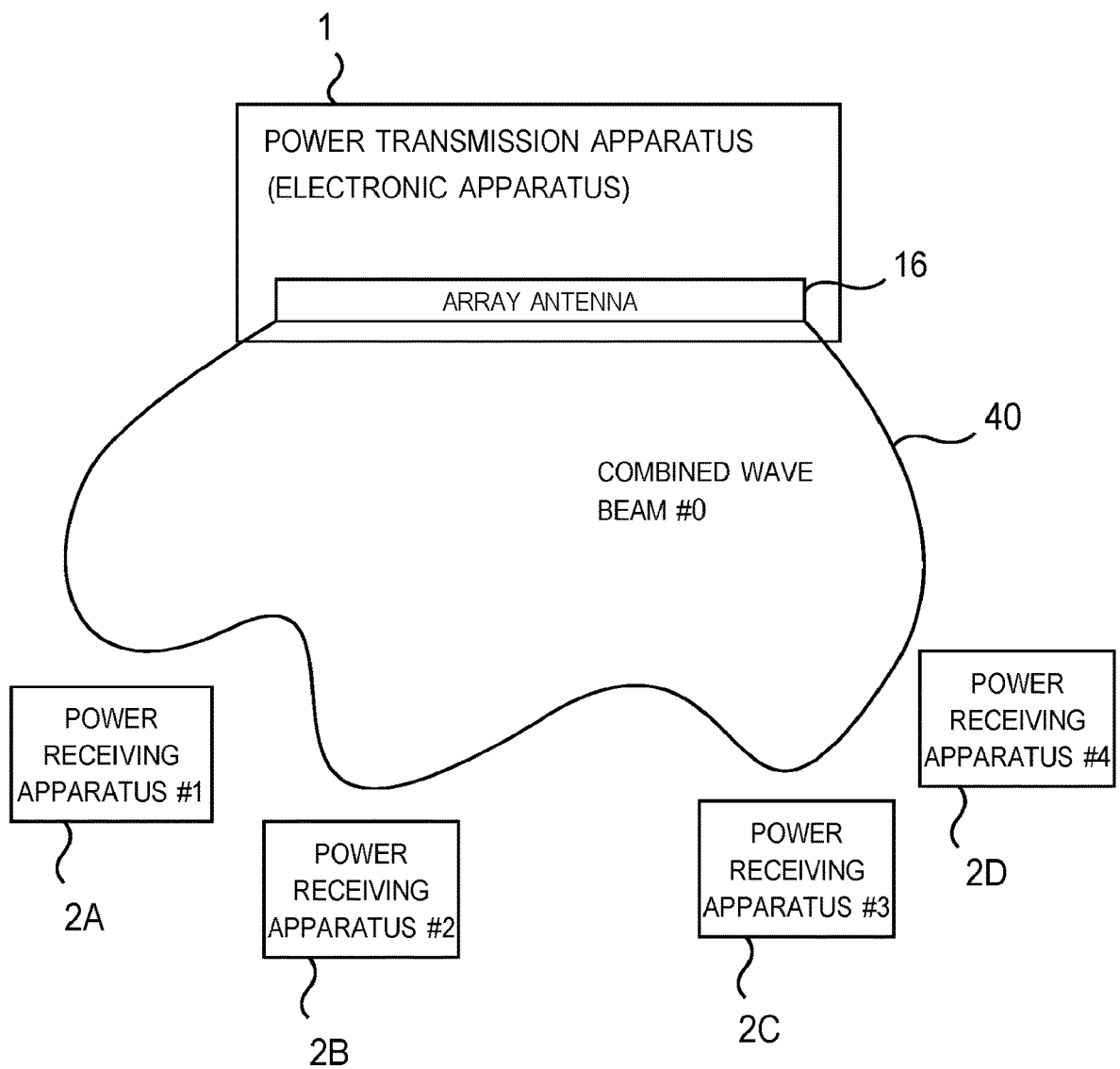
FIG. 2 is a plan view diagram illustrating an example of a combined wave beam of a first wireless signal emitted by a wireless power transmission apparatus.

The plurality of antennas 14b in the power transmission circuit 14 can be used as an array antenna. Thus, by controlling the phases and the amplitudes of the wireless signals transmitted by each of the antennas 14b, the directivity and the intensity of the transmitted combined wave beam can be changed. FIG. 2 is a plan view diagram illustrating an example of a combined wave beam (combined wave beam #0) of a first wireless signal emitted by a power transmission apparatus. In the example of FIG. 2, a power transmission apparatus 1 with an array antenna 16 and power receiving apparatuses 2A to 2D (power receiving apparatuses #1 to #4) are illustrated. The array antenna 16 includes antennas 14b and 15b of FIG. 1, for example. The line 40 in FIG. 2 connects each of the points where the average values of the electromagnetic field strength are equal. In the following, the directivity and the intensity of the combined wave beam are illustrated using lines connecting each of the points where the average values of the electromagnetic field strength are equal. By transmitting the combined wave beam #0 indicated by the line 40, the power transmission apparatus 1 can supply power to the power receiving apparatuses 2A to 2D (power receiving apparatuses #1 to #4).

The number of antennas 14b and the number of transmission circuits 14a in the power transmission circuit 14 is not limited. Also, the locations of the antennas 14b in the power transmission circuit 14 does not have to be aligned linearly in approximately straight lines. For example, a plurality of antennas 14b can form planar array antennas and curved surfaced array antennas. Thus, the coordination of the plurality of antennas 14b is not limited.

The wireless signal transmitted from the antenna 14b can be either wireless signals used for transmission of power (first wireless signals) or wireless signals used for data communication. Also, the transmitted wireless signal can be used for both transmission of power and data communication. Thus, the power transmission circuit 14 can include modulators and encoders. For example, the power transmission circuit 14 can transmit control signals requiring the power receiving apparatus to transmit the second wireless signals. The instructions in the control signal can be generated by the control circuit 12.

The frequency bands used by the wireless signal transmitted from the antenna 14b are not limited. Also, any type of communication standard can be used. For example, the power transmission circuit 14 can be OFDM transmitters which transmit OFDM (Orthogonal Frequency Division Multiplex) wireless signals. The power transmission circuit 14 can transmit data by using MIMO (Multiple-Input and Multiple Output).

The measuring circuit 15 receives second wireless signals with a plurality of antennas 15b. The measuring circuit 15 also includes a plurality of receiving circuits 15a. Each receiving circuit 15a includes an corresponding antenna 15b. Each receiving circuit 15a receives wireless signals using the corresponding antenna 15b. The plurality of antennas 15b in the measuring circuit 15 can be used as an array antenna. The number of antennas 15b (receiving circuits 15a) in the measuring circuit 15 is not limited. Also, the antennas 15b in the measuring circuit 15 does not necessary have to be aligned linearly (forming approximately straight lines). For example, a plurality of antennas 15b can be forming planar array antennas or curved surfaced array antennas.

In FIG. 1, different antennas were used for the reception of wireless signals and the transmission of wireless signals. However, at least some of the antennas can be shared for reception of wireless signals and transmission of wireless signals. Thus, the measuring circuit 15 can use a common array antenna with the power transmission circuit 14, meaning that the array antenna is used for both receiving wireless signals and transmitting wireless signals. In this case, the connection point of the antennas 14b, 15b (array antenna) can be changed between the transmission circuit 14a and the receiving circuit 15a by using a switch.

The measuring circuit 15 receives the wireless signals (second wireless signals) transmitted from the power receiving apparatuses 2A and 2B with the antennas 15b corresponding to each of the receiving circuits 15a. Then, the control circuit 12 can determine whether there is an object in the direction of the beam, based on the second wireless signal received at a plurality of timings. For example, the control circuit 12 can determine whether there is an object in the direction of the beam based on the time domain waveforms or the frequency domain waveforms of the second wireless signal received at a plurality of timings. If the control circuit 12 determines that there is an object in the direction of the beam, the control circuit 12 can change the shape of the beam by controlling at least either the amplitude or the phase of the first wireless signal provided to each of the antennas 14b. In the following, details of the process executed by the control circuit 12 are described.

The time domain waveform measured by the measuring circuit 15 is transmitted to the control circuit 12. The control circuit 12 can calculate at least the amplitude or the phase based on the measured time domain waveform. Also, the control circuit 12 can calculate the frequency domain waveform based on the measured time domain waveform. For example, the maximum value or the average value can be used as the amplitude. However, other representative values such as the peak value can be used. The control circuit 12 saves the above information to the storage 13, along with the time.

The control circuit 12 can estimate the incoming direction of the second wireless signal based on the time domain waveform transmitted from the measuring circuit 15. Examples of methods that can be used for estimating the incoming direction include: beamformer methods based on Fourier transformation, Capon methods, linear prediction methods and MUSIC (Multiple Signal Classification) methods. However, any type of method can be used. By calculating the channel matrices, the control circuit 12 can execute channel estimation of the second wireless signals transmitted from each power receiving apparatus. The control circuit 12 saves the above propagation path information to the storage 13, along with the time.

Figure 3:
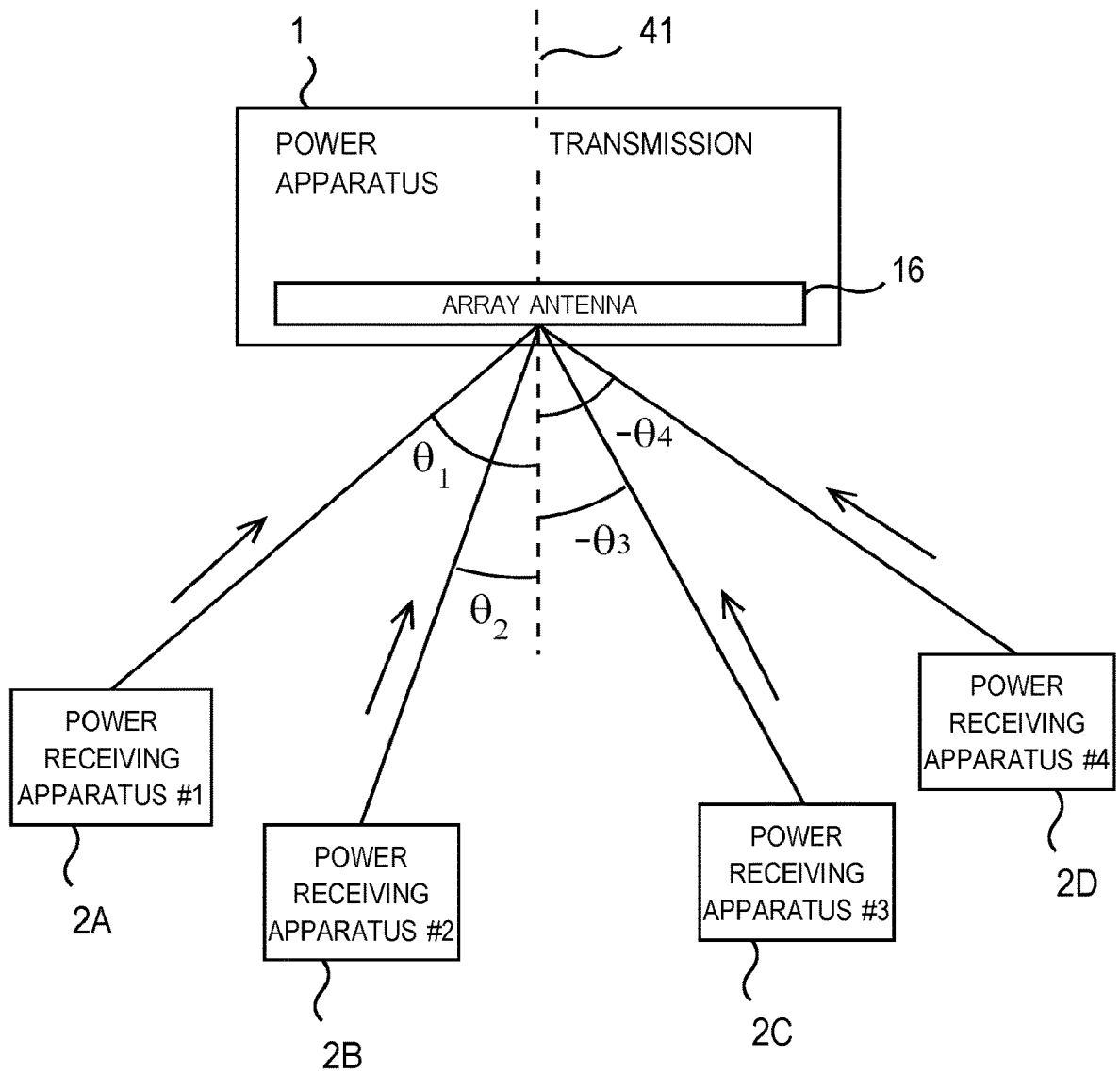
FIG. 3 is a plan view diagram illustrating an example of incoming directions of second wireless signals emitted by plurality of wireless power receiving apparatuses, transmitted to the wireless power receiving apparatus.

FIG. 3 is a plan view diagram illustrating an example of incoming directions of second wireless signals emitted by plurality of power receiving apparatuses, transmitted to the power receiving apparatus 1. In FIG. 3, a power transmission apparatus 1 with a linear (straight-lined) array antenna 16 and power receiving apparatuses 2A to 2D (power receiving apparatuses #1 to #4) are illustrated. Also, in FIG. 3, a broken line 41 which is perpendicular to the array antenna 16 is illustrated. In the plan view diagram of FIG. 3, the incoming directions of the second wireless signals transmitted by each power receiving apparatus are presented with the angle with respect to the broken line 41.

Here, $\theta_i$ (i=1, 2, ..., N) indicates the angle with respect to the broken line 41. The angles in the clockwise direction with respect to the broken line 41 are described using positive values. The angles in the anticlockwise direction with respect to the broken line 41 are described using negative values. For example, the second wireless signal transmitted by the power receiving apparatus 2A (power receiving apparatus #1) is received by the array antenna 16 with an angle of $+\theta_1$ with respect to the broken line 41. The second wireless signal transmitted by the power receiving apparatus 2B (power receiving apparatus #2) is received by the array antenna 16 with an angle of $+\theta_2$ with respect to the broken line 41. The second wireless signal transmitted by the power receiving apparatus 2C (power receiving apparatus #3) is received by the array antenna 16 with an angle of $-\theta_3$ with respect to the broken line 41. The second wireless signal transmitted by the power receiving apparatus 2D (power receiving apparatus #4) is received by the array antenna 16 with an angle of $-\theta_4$ with respect to the broken line 41.

The second wireless signals transmitted by the power receiving apparatuses can be wireless signals used for transmission of data. Also, the second wireless signals transmitted by the power receiving apparatuses can be beacon signals including information on the source wireless communication apparatus (for example, the identifier). In this case, the control circuit 12 of the power transmission apparatus 1 stores information on the source wireless communication apparatus (for example, the identifier) to the storage 13.

The measuring circuit 15 can include a decoder and a demodulator. Also, the frequency band of the wireless signal received by the antennas 15b of the measuring circuit 15 and the type of communication standard are not limited. For example, the measuring circuit 15 can be an OFDM receiver which is configured to receive an OFDM (Orthogonal Frequency Division Multiplex) wireless signal. Also, the measuring circuit 15 can receive data transmitted by MIMO (Multiple-Input and Multiple Output).

Next, the configuration of the power receiving apparatus 2A (power receiving apparatus #1) is described. The configuration of the other power receiving apparatuses including the power receiving apparatus 2B (power receiving apparatus #2) are similar to the power receiving apparatus 2A (power receiving apparatus #1). The power receiving apparatus 2A includes a receiving circuit 21a, an antenna 21b, a transmission circuit 22a, an antenna 22b, a control circuit 23, a rectifying circuit 24 and a secondary battery 25.

The receiving circuit 21a receives the wireless signal with the antenna 21b. The wireless signal received by the receiving circuit 21a can be the wireless signal used for transmission of power (first wireless signal). Also, the wireless signal received by the receiving circuit 21a can be the wireless signal used for communication of data. The wireless signal received by the receiving circuit 21a can be the wireless signal used for both transmission of power and communication of data. The receiving circuit 21a can include modulators and encoders. The frequency band of the wireless signal received by the receiving circuit 21a is not limited. Also, the communication standard used by the receiving circuit 21a is not limited. If the receiving circuit 21a is used for data communication, the received data is transmitted to the control circuit 23. If the wireless signal (first wireless signal) received by the receiving circuit 21a is used for transmission of power, the received signal is provided to the rectifier circuit 24. Then, the rectified output signal from the rectifier circuit 24 is provided to the secondary battery 25. Then, the secondary battery 25 can be charged by the rectified signal.

Examples of the rectifier circuit 24 include bridge-type rectifier circuits including full bridge circuits and half bridge circuits. However, the type of rectifier circuit is not limited. Although not illustrated in FIG. 1, the power receiving apparatus 2A (power receiving apparatus #1) can include a DC-DC converter. The DC-DC converter can boost or buck the power signal which is supplied to the secondary battery 25. Examples of the secondary battery 25 include lithium ion batteries, nickel-metal hydride batteries and lead storage batteries. However, any type of secondary battery can be used.

The transmission circuit 22a transmits the second wireless signal via the antenna 22b. The second wireless signal can be a beacon signal. Also, the second wireless signal can be signals used for transmitting data. The second wireless signal can include information indicating the source power receiving apparatus (for example, identifiers). The transmission circuit 22a can include modulators and encoders. The frequency band of the second wireless signal transmitted from the antenna 22b and the type of communication standard are not limited. For example, the transmission circuit 22a can be an OFDM transmitter which transmits OFDM wireless signals.

The control circuit 23 controls each component of the power receiving apparatus 2A (power receiving apparatus #1). For example, the control circuit 23 receives the control signal transmitted from the power transmission apparatus 1 with the antenna 21b and the receiving circuit 21a. If the control signal includes the request for transmitting the second wireless signal, the control circuit 23 transmits the second wireless signal to the power transmission apparatus 1 from the transmission circuit 22a and the antenna 22b. The second wireless signal can include information such as the output voltage of the secondary battery 25 during discharge, the output current of the secondary battery 25 during discharge and the remaining capacity (referred to as the battery information). The control circuit 12 of the power transmission apparatus 1 which receives the second wireless signal can determine at least either the order or the priority for supplying power to each of the power receiving apparatuses, based on the battery information.

Also, the control circuit 23 can control and monitor the charging timings and discharging timings of the secondary battery 25. If a switch is installed in the rectifier circuit 24, the control circuit 23 can enable or disable the flow of the power signal to the secondary battery 25 by controlling the switch. The control circuit 23 can include a processor which is configured to execute various instructions or programs. The control circuit 23 can include hardware circuits such as ASIC, FPGA and PLD, for example. Also, the control circuit 23 can include a memory and/or a storage configured to store instructions, programs, data used for executing instructions or data used for executing programs.

Figure 4:
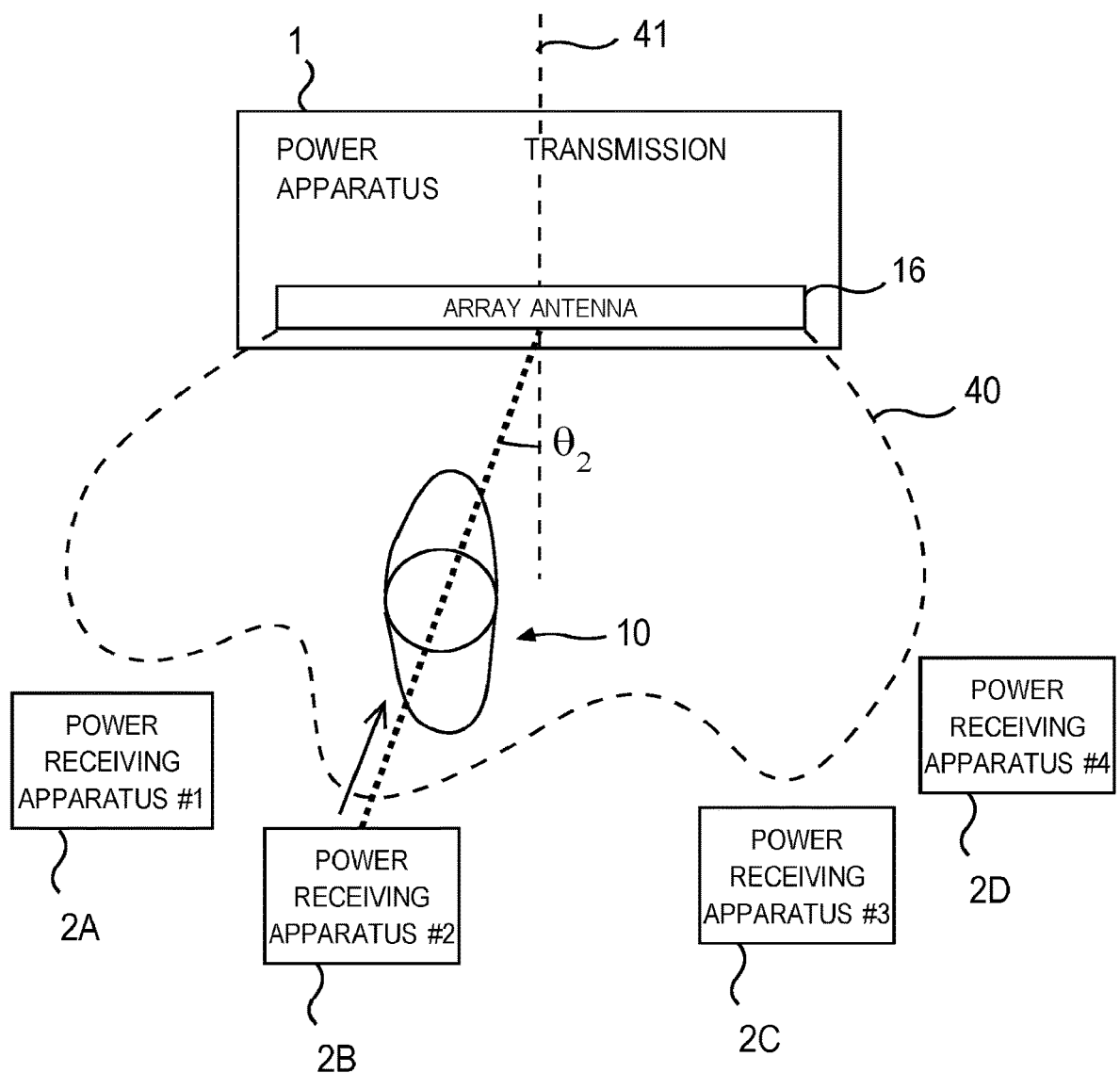
FIG. 4 is a plan view diagram illustrating an example detection of human body by the second wireless signal.

FIG. 4 is a plan view diagram illustrating an example detection of human body by the second wireless signal. In the plan view diagram of FIG. 4, a human body 10 is intruding to the space between the power receiving apparatus 2B (power receiving apparatus #2) and the power transmission apparatus 1. For example, the human body 10 can be a moving pedestrian. Also, the human body 10 can be standing still or sitting still. In FIG. 4, the human body 10 is located in the propagation path between the power receiving apparatus 2B (power receiving apparatus #2) and the power transmission apparatus 1. Therefore, the human body 10 becomes an obstacle for the propagation of the wireless signal between the power receiving apparatus 2B (power receiving apparatus #2) and the power transmission apparatus 1. In the example of FIG. 4, the intensity and the waveforms of the second wireless signal received by the power transmission apparatus 1 can become different from cases when there are no objects, due to reflection and absorption of electromagnetic waves by the object.

The control circuit 12 of the power transmission apparatus 1 can determine whether there is a human body 10 (an object) based on the propagation path information obtained at a plurality of timings. The propagation path information can be stored in the storage 13. Various criteria can be used in the process of determining the presence of intruding objects. For example, if the representative value for the amplitude of the second wireless signal decreases and the amount of decrease is equal to or greater than the threshold value, it could be determined that there is a human body 10 in the propagation path. Also, if the amount of phase change in the second wireless signal is greater than the threshold value, it could be determined that there is a human body 10 in the propagation path. Also, by using the correlation between the average waveform of the second wireless signal measured in the past and the waveform of the second wireless signal measured in the most recent timing, the presence of the human body 10 in the propagation path can be determined. In this case, the waveform can be either the waveform in the time domain or the waveform in the frequency domain. Criteria different from the ones described above can be used. Also, the process of determining the presence of intruding objects can be executed by combining a plurality of criteria mentioned above.

If the human body 10 is in the location illustrated in FIG. 4, the human body 10 would be exposed to strong electromagnetic waves when the power transmission apparatus 1 transmits the first wireless signal with the form of the combined wave beam #0 (broken line 40) illustrated in FIG. 1, which may pose a potential risk to the safety of the human body 10. If other objects exist in the location of the human body 10, it may cause other potential risks. For example, due to the exposure to electromagnetic waves, failures and malfunctions of electronic apparatuses may occur. Also, if conductive objects such as metals are in the location of the human body 10, the abnormal heating of the object may occur, depending on the electromagnetic field strength.

Figure 5:
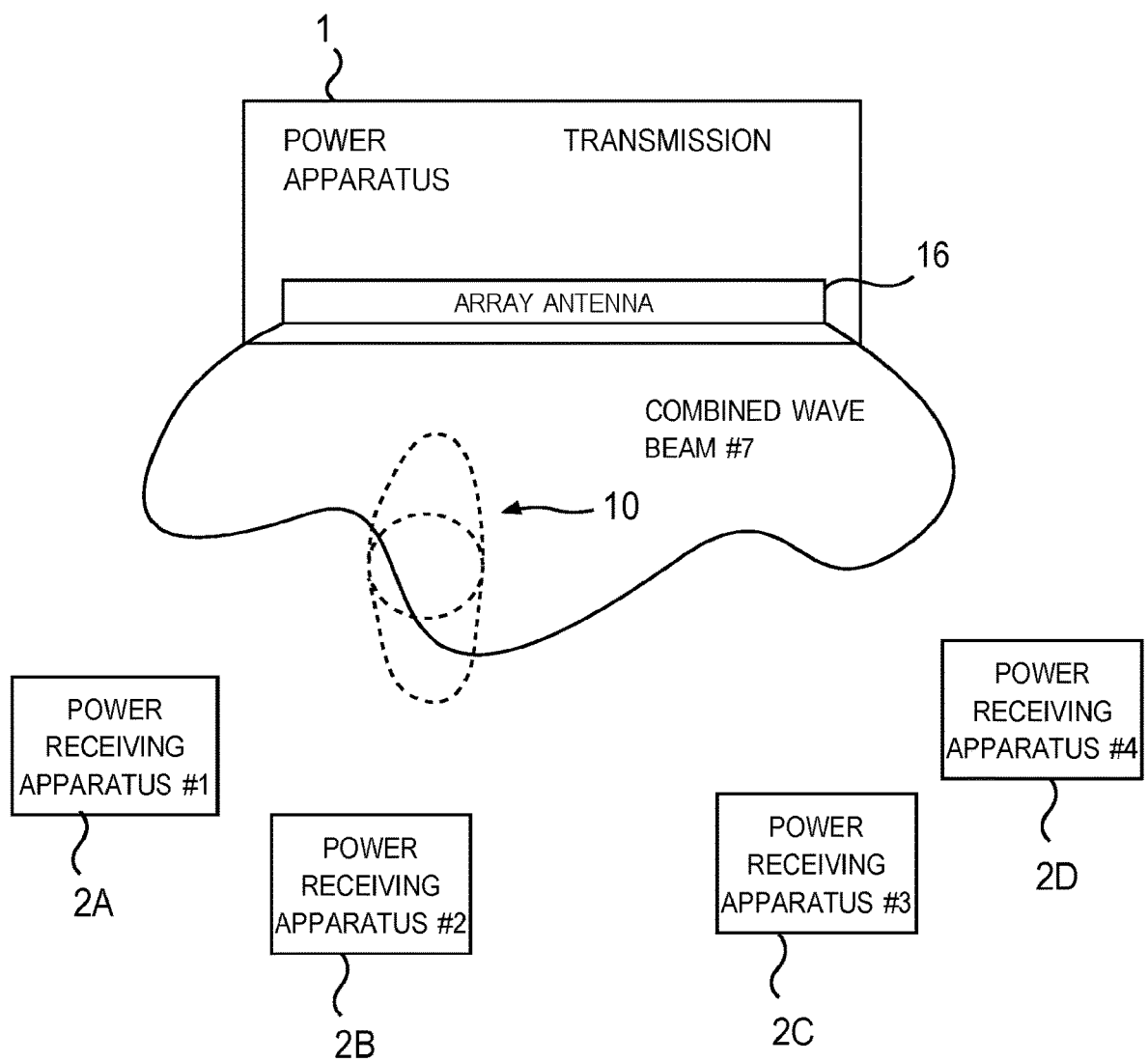
FIG. 5 is a plan view diagram illustrating an example of a combined wave beam of the first wireless signal when the transmission power is reduced.

Thus, if the control circuit 12 of the power transmission apparatus 1 detects objects such as the human body in the propagation paths between either of the power receiving apparatuses, the first wireless signals with smaller transmission power values could be transmitted. In the plan view diagram of FIG. 5, an example of a combined wave beam #7 transmitted with a smaller transmission power value compared to the combined wave beam #0 of FIG. 1 is illustrated. The power transmission apparatus 1 can reduce various potential risks caused by the exposure of objects such as the human body 10 to electromagnetic waves by transmitting the combined wave beam #7 instead of the combined wave beam #0.

The reduction of the transmission power in the first wireless signal is only an example of the process which can be executed when objects such as the human body are detected in the propagation paths between the power transmission apparatus 1 and either of the power receiving apparatuses. For example, the power transmission apparatus 1 can stop the transmission of the first wireless signal until objects such as the human body are no longer detected. Also, if first wireless signals are transmitted in pulse-form, the widths of the pulse can be reduced, setting the duty ratio of the waveforms to a smaller value. Thus, in order to reduce the amount of electromagnetic energy transmitted in each unit time, the transmission setting of the first wireless signal can be changed, changing the shape of the transmitted combined wave beam. For example, if the control circuit 12 of the power transmission apparatus 1 determines that an object is in the direction of the beam, the control circuit 12 can execute the process including at least either the reduction of the transmission power of the first wireless signal or the reduction of the duty ratio of the first wireless signal.

Figure 6:
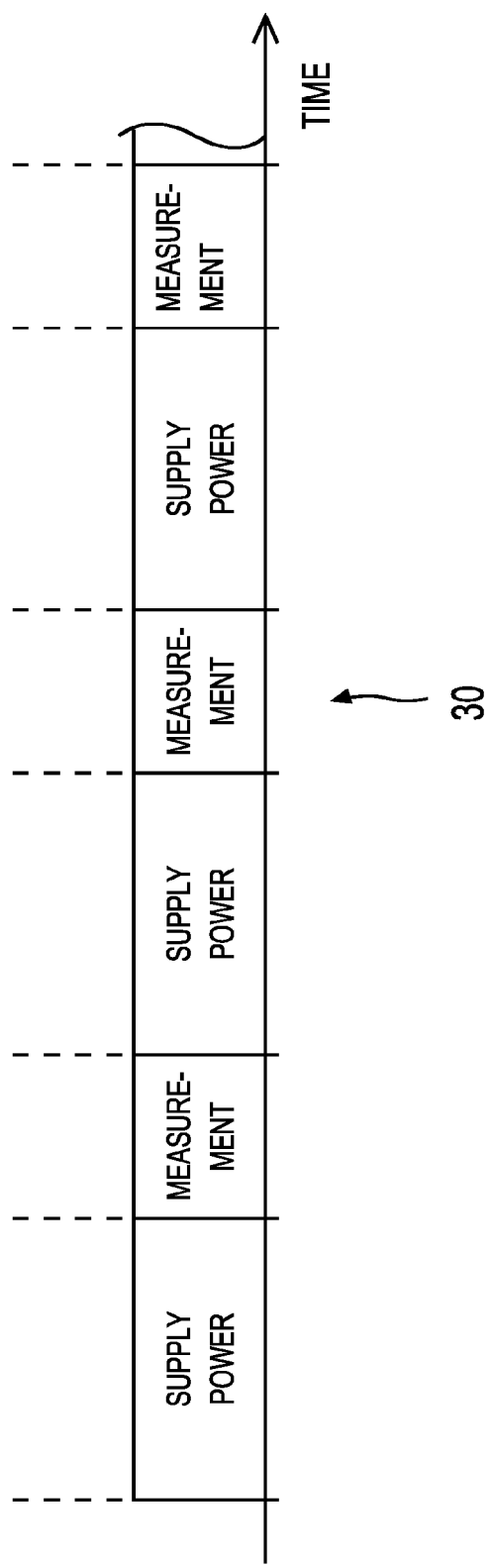
FIG. 6 is a timing diagram illustrating an example of execution timings of a power transmission process and a measurement process.

FIG. 6 is a timing diagram illustrating an example of execution timings of a power transmission process and a measurement process (timing diagram 30). The horizontal axis of the timing diagram 30 represents the time. During the power transmission process, the power transmission circuit 14 transmits a beam of electromagnetic waves. During the measurement process, the measuring circuit 15 detects objects in the direction of the beam by receiving the second wireless signal. If it is determined that an object exists during the measurement process, the control circuit 12 can control at least either the amplitude or the phase of the first wireless signal provided to the plurality of antennas 15*b*.

During the power transmission process, a plurality of power receiving apparatuses can transmit the second wireless signals concurrently to the power transmission apparatus 1. Also, during the power transmission process, each power receiving apparatus can transmit the second wireless signal sequentially, ensuring that the timings when the second wireless signals are transmitted do not overlap. In this case, the order each power receiving apparatus transmits the second wireless signal during the duration of the power transmission process is not limited. Also, during the duration of the measurement process, all the power receiving apparatuses can be transmitting the second wireless signal. During the duration of the measurement process, some of the power receiving apparatuses can be transmitting the second wireless signal. In the timing diagram 30, the power transmission process and the measurement process are executed alternately. When the power transmission apparatus 1 is launched, the power transmission process can be executed first. Also, when the power transmission apparatus 1 is launched, the measurement process can be executed first. However, the measurement process can be executed before the power transmission process in order to reduce the exposure of objects such as the human body to electromagnetic waves.

Figure 7:
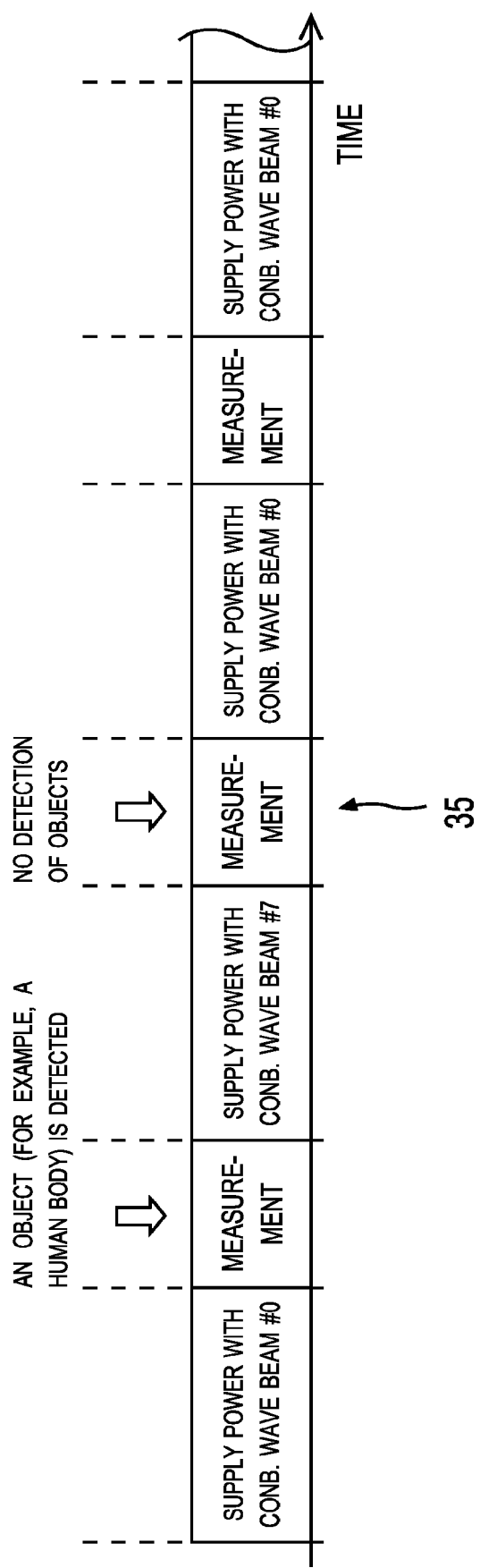
FIG. 7 is a timing diagram presenting an example of executed processing steps depending on the detection of a human body.

If an object such as the human body is detected in the propagation path between the power transmission apparatus 1 and either of the power receiving apparatuses during the measuring process, the transmission setting of the first wireless signal can be changed. For example, for the timing diagram 35 in FIG. 7, if an object is detected in the measurement process, the combined wave beam #7 is transmitted in the next power transmission process. Also, for the timing diagram 35 in FIG. 7, if an object is not detected in the measurement process, the combined wave beam #0 is transmitted in the next power transmission process.

Figure 8:
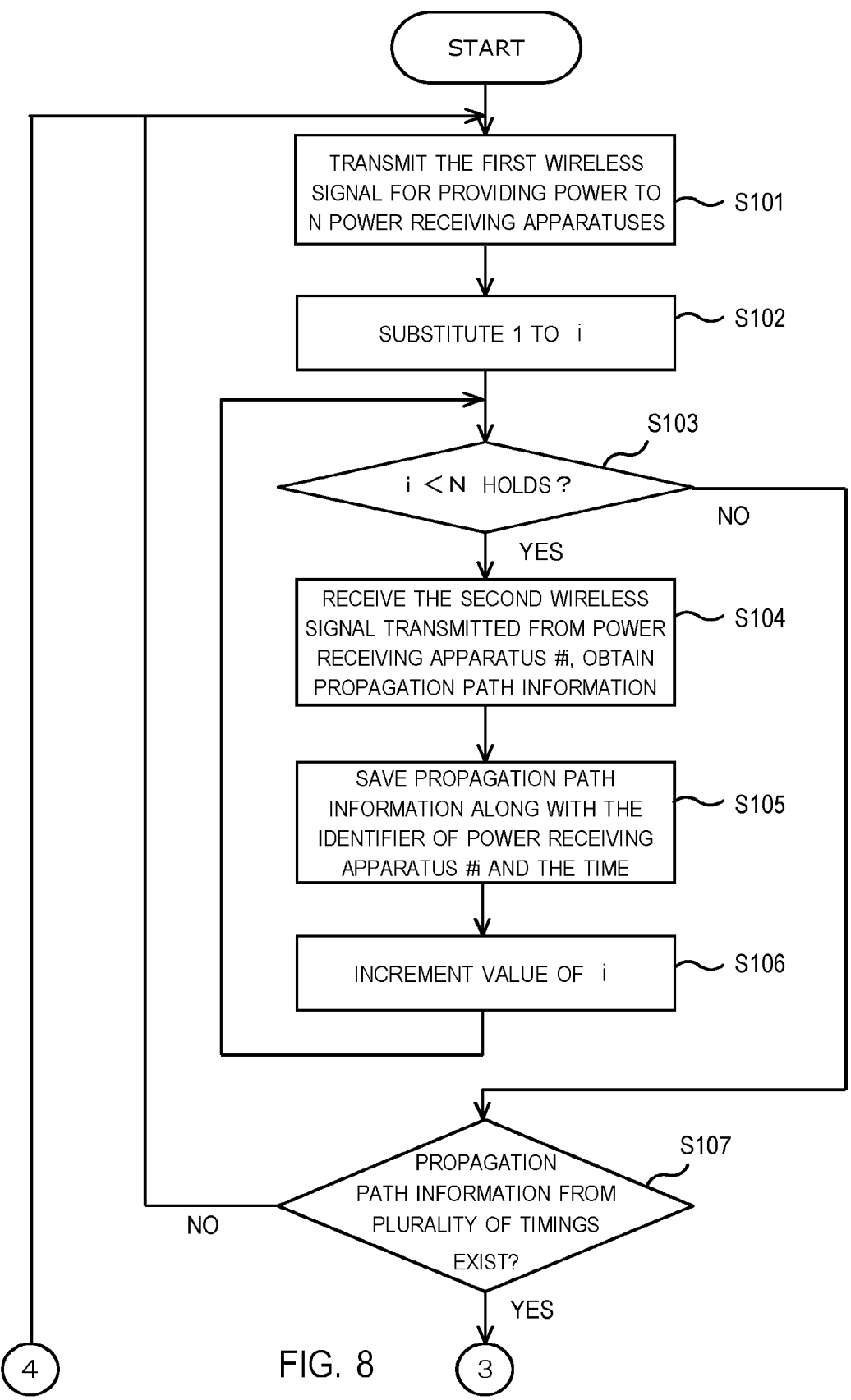
FIG. 8 is a flowchart presenting an example of processes executed by the wireless power transmission apparatus according to the first embodiment.
Figure 9:
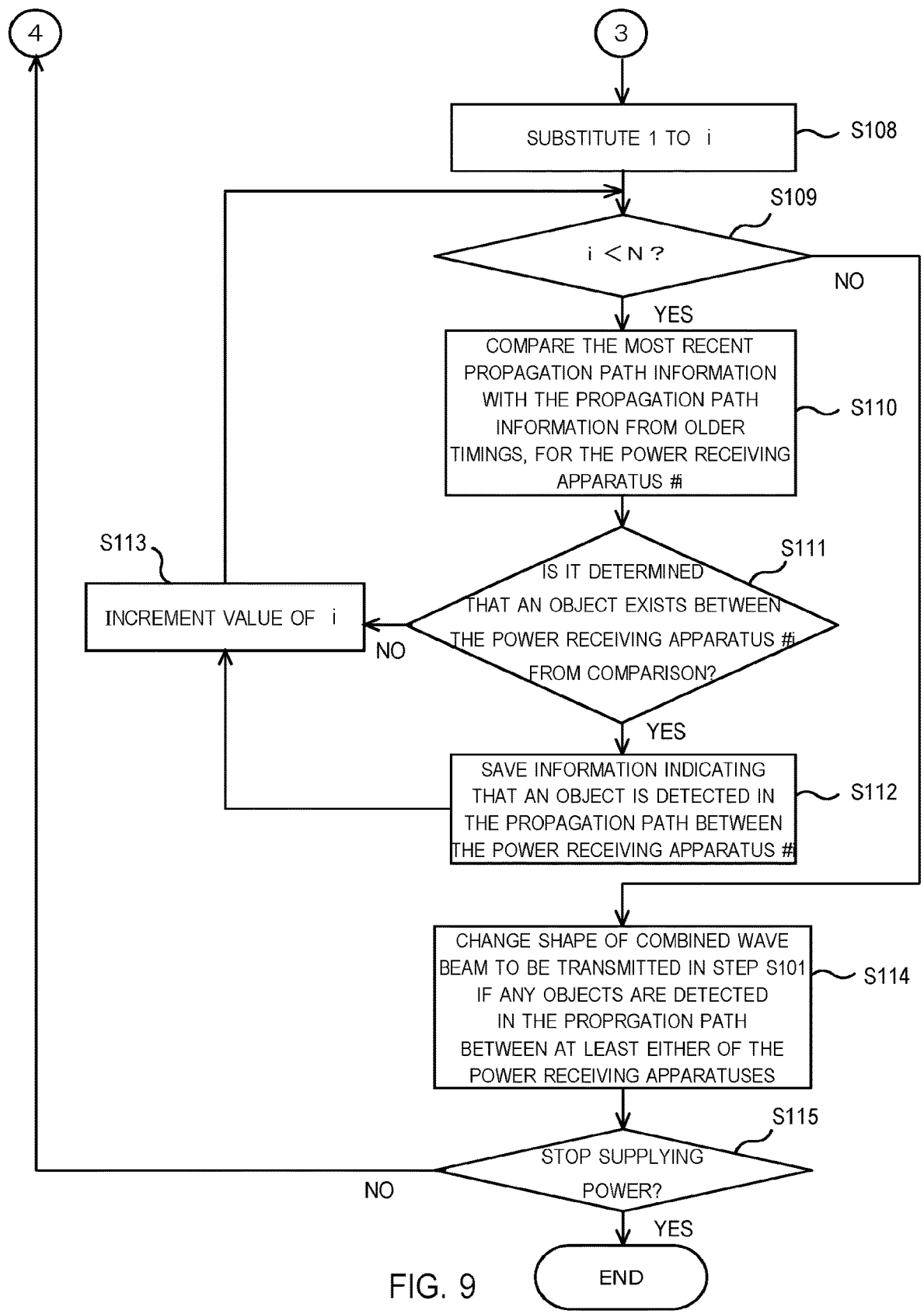
FIG. 9 is a flowchart presenting an example of processes executed by the power transmission apparatus according to the first embodiment.

Next, an example of the process executed by the power transmission apparatus 1 is described. FIG. 8 and FIG. 9 present a flowchart showing an example of processes executed by the power transmission apparatus according to the first embodiment. In the following, the process is described with reference to FIG. 8 and FIG. 9.

First, the power transmission apparatus 1 transmits the first wireless signal to provide power to N power receiving apparatuses (step S101). Then, the control circuit 12 of the power transmission apparatus 1 substitutes the value 1 to the variable i (step S102). The number corresponding to the power receiving apparatus is stored in the variable i. Then, it is determined whether the value of the variable i is smaller than the total number of power receiving apparatuses N (step S103).

If the control circuit 12 of the power transmission apparatus 1 determines that the value of the variable i is smaller than the number of power receiving apparatuses N (YES in step S103), the power transmission apparatus 1 receives the second wireless signal transmitted from the power receiving apparatus #i and obtains the propagation path information (step S104). In step S104, the power transmission apparatus 1 can transmit control signals requiring the transmission of second wireless signals to the power receiving apparatus #i. The propagation path information is saved in the storage 13, along with the identifier of the power receiving apparatus #i and the time (step S105). Examples of the identifier include the MAC address, the serial number and the manufacturing number. However, the format of the identifier is not limited. Then, the control circuit 12 of the power transmission apparatus 1 increments the value of variable i (step S106). After the process of step S106 is executed, the process of step S103 is executed again. Depending on the result of step S103, the process which is executed branches.

If the control circuit 12 of the power transmission apparatus 1 determines that the value of the variable i is greater than the number of power receiving apparatuses N (NO in step S103), the control circuit 12 of the power transmission apparatus 1 confirms whether the propagation path information for a plurality of timings is stored in the storage 13 of the power transmission apparatus 1 (step S107). If the propagation path information obtained in a plurality of timings is not saved in the storage 113 (NO in step S107), the process of step S101 and beyond are executed.

If the propagation path information from a plurality of timings is saved in the storage 13 (YES in step S107), the control circuit 12 of the power transmission apparatus 1 resets the value of the variable i to 1 (step S108). Then, the control circuit 12 of the power transmission apparatus 1 determines whether the value of the variable i is smaller than the number of power receiving apparatuses N (step S109).

If the value of the variable i is greater than the number of the power receiving apparatuses N (YES in step S109), the control circuit 12 of the power transmission apparatus 1 refers to the storage 13, comparing the most recent propagation path information with the propagation path information from older timings, for the power receiving apparatus #i (step S110). The propagation path information from the older timings can be the propagation path information obtained at a specific timing. Also, the propagation path information from the older timings can be the propagation path information at a plurality of timings excluding the most recent timing. Also, the average value calculated from the propagation path information obtained at the plurality of timings and the propagation path information from the most recent timing can be compared. The process executed in step S110 is described in the explanation for FIG. 4.

The control circuit 12 of the power transmission apparatus 1 determines whether there is an object in the propagation path between the power transmission apparatus 1 and the power receiving apparatus #i using the result of comparison in step S110 (step S111). If the control circuit 12 of the power transmission apparatus 1 determines that there is an object in the propagation path between the power transmission apparatus 1 and the power receiving apparatus #i (YES in step S111), information indicating that an object is detected in the propagation path between the power transmission apparatus 1 and the power receiving apparatus #i is saved in the storage 13 (step S112). If the control circuit 12 of the power transmission apparatus 1 determines that an object exists in the propagation path, the control circuit 12 can increase the directivity of the array antenna 16 during the reception of the second wireless signal, to ensure that the location of the object and the incoming direction of signals can be estimated with higher accuracy. Also, the control circuit 12 can extend the reception period of the second wireless signal to a longer duration, improving the accuracy for estimating the incoming direction. The control circuit 12 can execute at least either the former process or the later process before estimating the location and/or the direction of the object.

If the control circuit 12 of the power transmission apparatus 1 determines that an object does not exist in the propagation path between the power transmission apparatus 1 and the power receiving apparatus #1 (NO in step S111) or if the process of step S112 is executed, the control circuit 12 of the power transmission apparatus 1 increments the value of variable i (step S113). If the process of step S113 is executed, the process of step S109 is executed again. The process which is executed branches, depending on the result.

If the value of the variable i is smaller than the number of power receiving apparatuses N (NO in step S109), the control circuit 12 of the power transmission apparatus 1 refers to the storage 13. If any objects are detected in the propagation paths between the power transmission apparatus 1 and at least either of the power receiving apparatuses, the shape of the combined wave beam to be transmitted in step S114 is changed (step S113). If the control circuit 12 of the power transmission apparatus 1 determines that an object exists in the propagation paths between the power transmission apparatus 1 and either of the power receiving apparatuses, the transmission setting of the first wireless signal is changed. If the control circuit 12 of the power transmission apparatus 1 determines that objects do not exist in the propagation paths between the power transmission apparatus 1 and either of the power receiving apparatuses, the control circuit 12 of the power transmission apparatus 1 can maintain the current transmission setting of the first wireless signal. Then, the power transmission apparatus 1 transmits the first wireless signal for supplying power to the N power receiving apparatuses (step S114). In the next step (step S115), the control circuit 12 of the power transmission apparatus 1 determines whether the process of supplying power needs to be stopped. If the process of supplying power needs to be stopped, the power transmission apparatus 1 completes the process of FIG. 8 and FIG. 9. If the process of supplying power is continues, the power transmission apparatus 1 executes step S101 and the steps beyond, again.

Second Embodiment

In the power transmission apparatus according to the first embodiment, the first wireless signal was transmitted to ensure that power is supplied to a plurality of power receiving apparatuses. However, the power transmission apparatus does not necessary have to direct the transmitted first wireless signal to the plurality of power receiving apparatuses. Also, in the power transmission apparatus according to the first embodiment, if objects such as the human body were detected in the propagation paths between the power transmission apparatus and at least either of the power receiving apparatuses, the power transmission apparatus 1 changed the transmission setting to ensure that the amount of electromagnetic energy transmitted per unit time is reduced. In the second embodiment, examples of processes including the modification of directivity of transmitted electromagnetic waves are described. The configuration of the power transmission apparatus and the power receiving apparatus (wireless power transmission system) according to the second embodiment is similar to the first embodiment. In the following, mainly the differences between the second embodiment and the first embodiment are explained.

The power transmission apparatus according to the second embodiment transmits the combined wave beams of the first wireless signals with a stronger directivity in the direction of each wireless communication apparatus. FIG. 10 to FIG. 13 illustrate examples of such combined wave beams.

For example, the control circuit 12 of the power transmission apparatus 1 controls at least either the phase or the amplitude of the signals provided to each of the antennas 14b, to ensure that the directivity in the angle $+\theta_1$ in FIG. 3 becomes stronger. Thereby, it is possible to generate a combined wave beam #1 with high electromagnetic field strength in the direction of the power receiving apparatus 2A (power receiving apparatus #1). By using the combined wave beam #1, efficient wireless power transmission to the power receiving apparatus 2A (power receiving apparatus #1) becomes possible.

The control circuit 12 of the power transmission apparatus 1 can control at least the phase or amplitude of the signals provided to each of the antennas 14b to ensure that the directivity to the angle +$\theta_2$ in FIG. 3 becomes stronger. Thereby, as illustrated in the plan view diagram of FIG. 11, a combined wave beam #2 with a high electromagnetic field strength in the direction of the power receiving apparatus 2B (power receiving apparatus #2) can be generated. By using the combined wave beam #2, efficient wireless power transmission to the power receiving apparatus 2B (power receiving apparatus #2) becomes possible.

Figure 10:
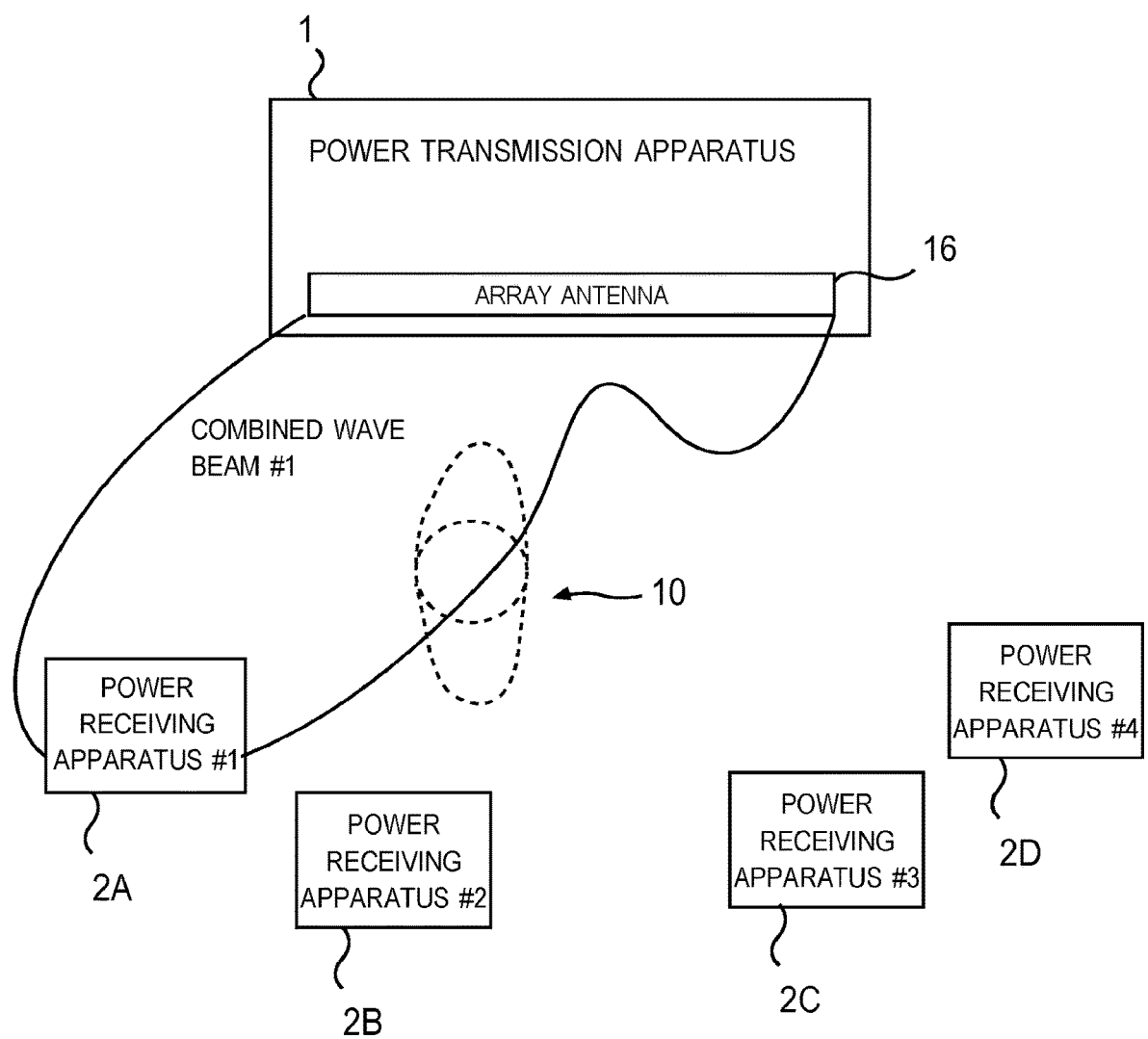
FIG. 10 is a plan view diagram illustrating an example of a combined wave beam of the first wireless signal with stronger directivity in the direction of the wireless power receiving apparatus #1.
Figure 11:
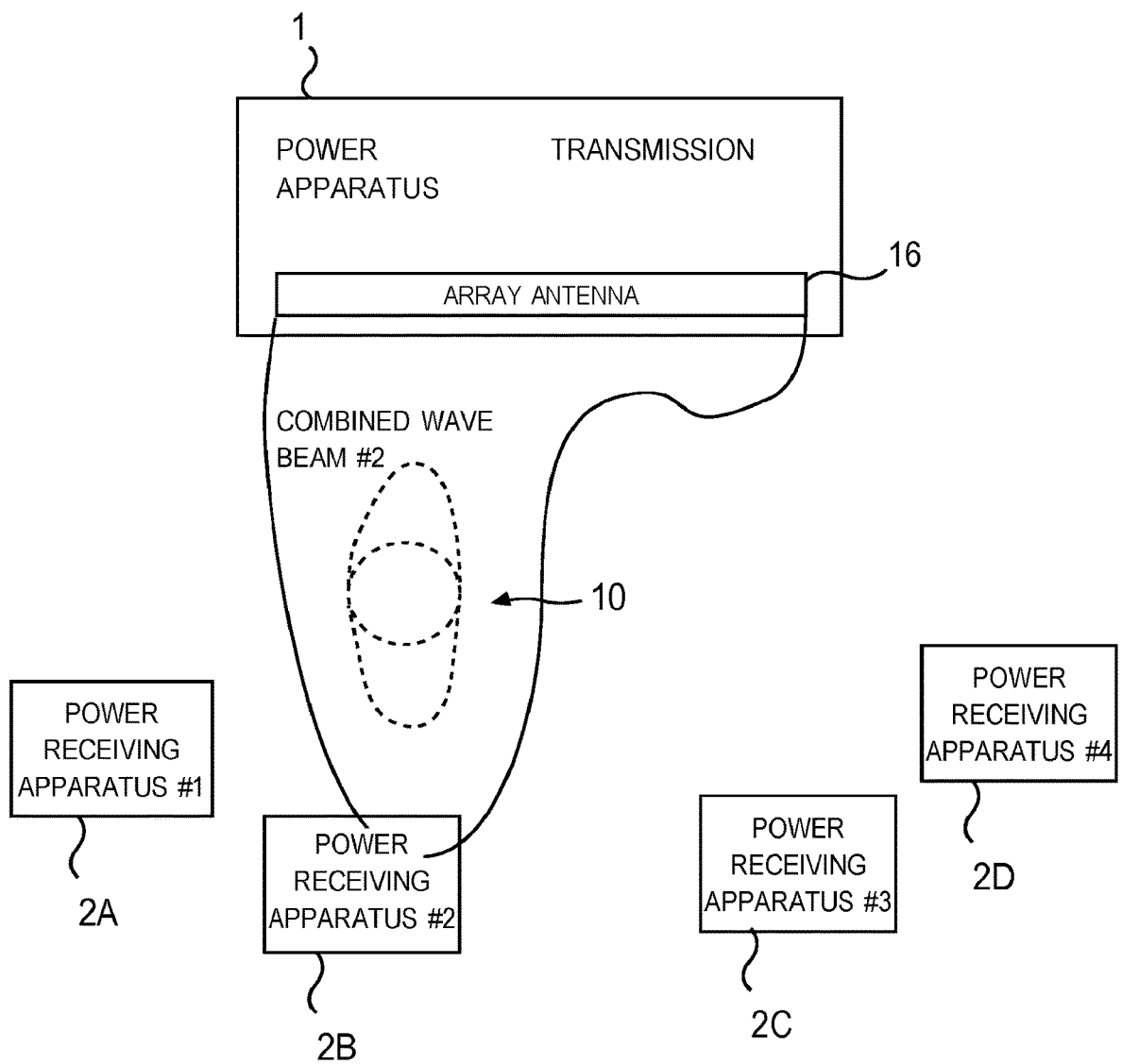
FIG. 11 is a plan view diagram illustrating an example of a combined wave beam of the first wireless signal with stronger directivity in the direction of the wireless power receiving apparatus #2.

In the examples of FIG. 10 and FIG. 11, a combined wave beam with high electromagnetic field strength is emitted in the direction of the human body 10. In the following, examples of combined wave beams which reduce the exposure of electromagnetic waves to the human body 10 are described.

The control circuit 12 of the power transmission apparatus 1 can control at least the phase or the amplitude of the signals transmitted from each transmission circuit 14a (signals provided to each antenna 14b) to ensure that the directivity to the angle −$\theta_3$ in FIG. 3 becomes stronger. Thereby, as illustrated in the plan view diagram of FIG. 12, a combined wave beam #3 with a high electromagnetic field strength in the direction of the power receiving apparatus 2C (power receiving apparatus #3) can be generated. By using the combined wave beam #3, efficient wireless power transmission to the power receiving apparatus 2C (power receiving apparatus #3) becomes possible. Similarly, the control circuit 12 of the power transmission apparatus 1 can control at least the phase or the amplitude of the signals transmitted from each transmission circuit 14a (signals entered to each antenna 14b) to ensure that the directivity to the angle −$\theta_3$ in FIG. 3 becomes stronger. Similarly, the control circuit 12 of the power transmission apparatus can control at least the phase or the amplitude of the signals transmitted from each transmission circuit 14a (signals provided to each antenna 14b) to ensure that the directivity to the angle −$\theta_4$ in FIG. 3 becomes stronger. Thereby, as illustrated in the plan view diagram of FIG. 13, a combined wave beam with a high electromagnetic field strength in the direction of the power receiving apparatus 2D (power receiving apparatus #4) can be generated. Thus, efficient supplying of power to the power receiving apparatus 2D (power receiving apparatus #4) becomes possible.

Figure 12:
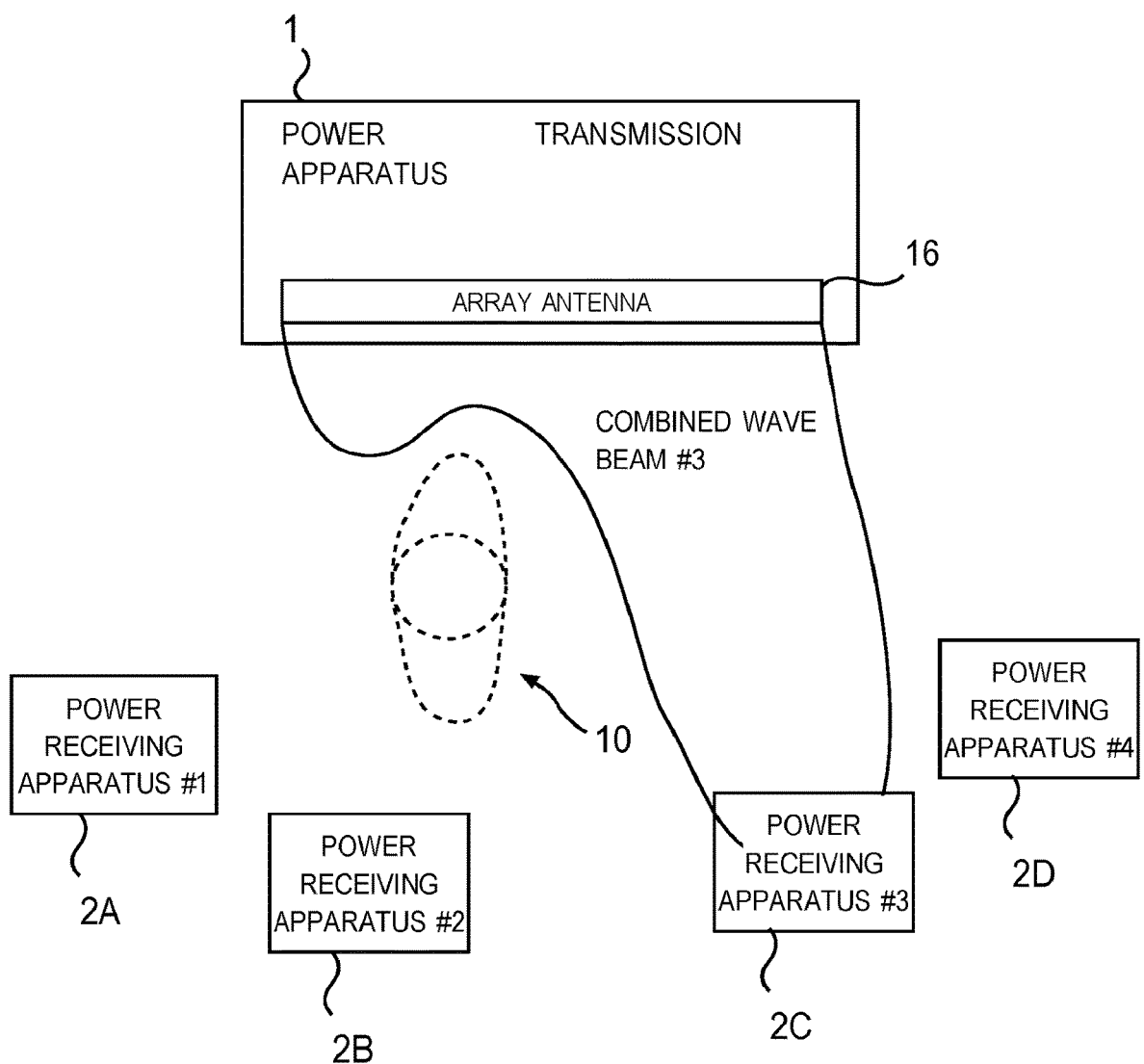
FIG. 12 is a plan view diagram illustrating an example of a combined wave beam of the first wireless signal with stronger directivity in the direction of the wireless power receiving apparatus #3.
Figure 13:
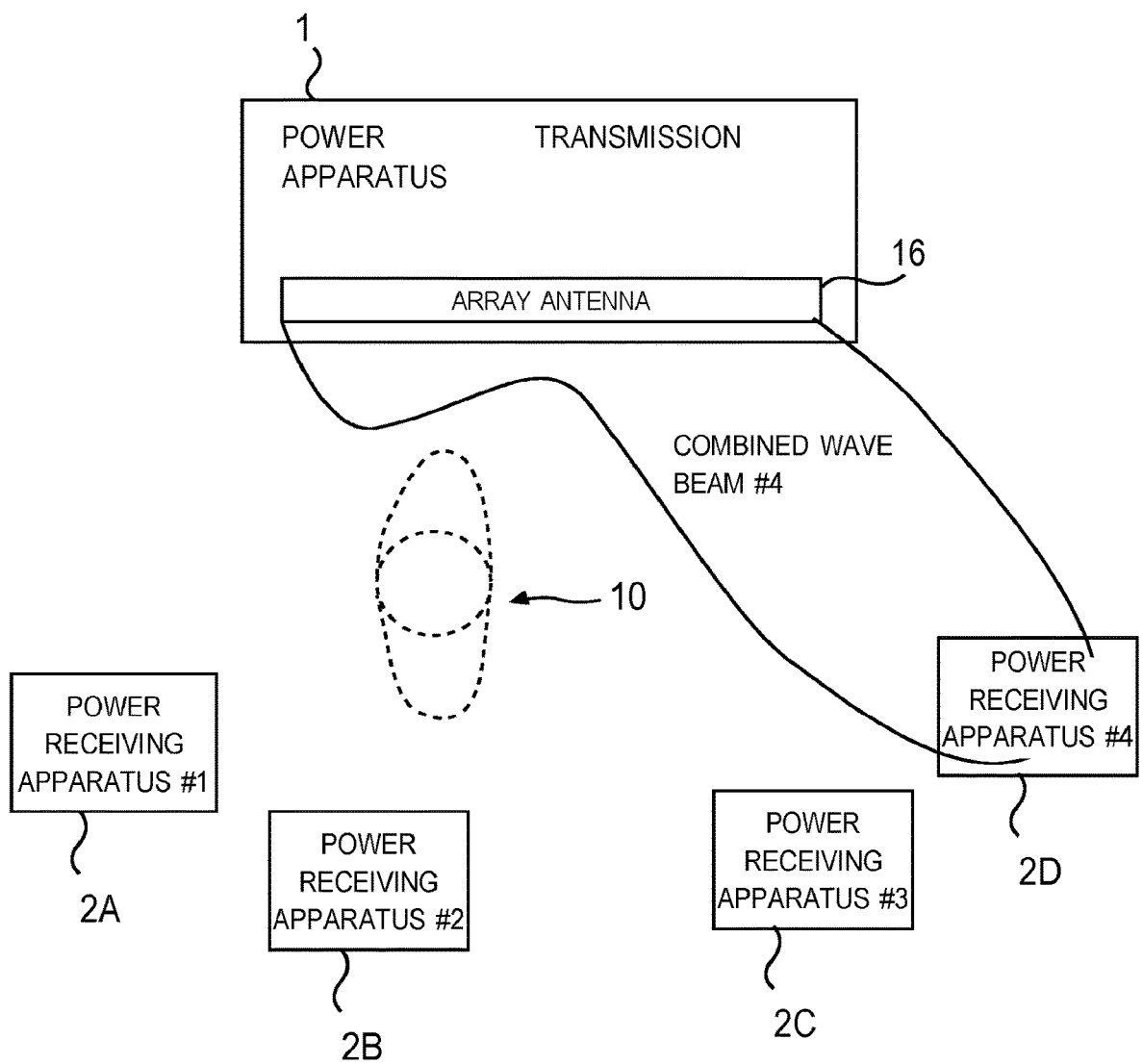
FIG. 13 is a plan view diagram illustrating an example of a combined wave beam of the first wireless signal with stronger directivity in the direction of the wireless power receiving apparatus #4.

In the examples of FIG. 12 and FIG. 13, it is possible to reduce the exposure of the human body 10 to the electromagnetic field of the combined wave beams.

The control circuit 12 of the power transmission apparatus 1 can save information of the angle where the directivity of each combined wave beam becomes higher, the phases of the wireless signal provided to each antenna 14b when the corresponding combined wave beam is transmitted and the amplitudes of the wireless signal provided to each antenna 14b when the corresponding combined wave beam is transmitted (transmission settings). For example, in the cases of FIG. 10 to FIG. 13, the transmission settings of the combined wave beam #1, the angle +$\theta_1$, the transmission settings of the combined wave beam #2, the angle +$\theta_2$, the transmission settings of the combined wave beam #3, the angle −$\theta_3$, the transmission settings of the combined wave beam #4 and the angle −$\theta_4$ can be saved in the storage 13.

The control circuit 12 of the power transmission apparatus 1 can save information of the angles where the gains of each combined wave beam becomes lower, to the storage 13. For example, for the cases of FIG. 10 to FIG. 13, information indicating that the gains of the combined wave beams #1, #2 becomes lower in the angles −$\theta_3$ and −$\theta_4$ and the gains of the combined wave beams #3, #4 becomes lower in the angles +$\theta_1$ and +$\theta_2$ are saved. The control circuit 12 of the power transmission apparatus 1 selects the combined wave beam transmitted during the power transmission process from a set of combined wave beams which are predetermined by referring to the storage 13. The selection of the transmitted combined wave beam can be executed based on at least either the information of the angle where the power receiving apparatus with high priority for wireless power supply is located and the angle where objects such as the human body are detected.

In the following, examples of the power transmission process and the measurement process executed by the power transmission apparatus according to the second embodiment are described. In FIG. 14, timing diagrams 31 and 32 are presented. The timing diagram 31 corresponds to the case when objects (for example, the human body) are not detected in the propagation path between the power transmission apparatus 1 and the power receiving apparatus. The timing diagram 32 corresponds to the case when objects (for example, the human body) are detected in the propagation path between the power transmission apparatus 1 and the power receiving apparatus. In the timing diagrams 31 and 32, the horizontal axes represent the time, respectively. In the timing diagrams 31 and 32, the power transmission apparatus 1 is executing power transmission process and the measurement process, alternately.

Referring to the timing diagrams 31 and 32, each type of combined wave beam are transmitted in a predetermined order, for each of the durations when the power transmission processes are executed. In the timing diagram 31, the combined wave beam #1 is transmitted in the first duration. In the second duration, the combined wave beam #2 is transmitted. In the third duration, the combined wave beam #3 is transmitted. In the fourth duration, the combined wave beam #4 is transmitted. Then, in the fifth duration, the combined wave beam #1 is transmitted again. Thus, the control circuit 12 of the power transmission apparatus 1 can change the beams transmitted in each of the durations of the power transmission process to beams with different directivities, using a predetermined set of beams. Thus, the control circuit 12 can be configured to change a directivity of the transmitted beam at each of the power transmission processes, using a first set of beams including a plurality of beams. Here, each of the beams in the plurality of beams have different directivities.

In the timing diagram 32, the combined wave beam #3 is transmitted in the first duration. In the second duration, the combined wave beam #4 is transmitted. In the third duration, the combined wave beam #3 is transmitted again. In the fourth duration, the combined wave beam #4 is transmitted again. In the timing diagram 32, the combined wave beams #1 and #2 are not transmitted. Therefore, if the human body 10 is standing in the location illustrated in FIG. 10 to FIG. 13, the exposure of electromagnetic waves to the human body 10 can be reduced. If the control circuit 12 of the power transmission apparatus 1 detects an object in either of the directions of the beams included in the first set during the measurement process, the second set can be used instead of the first set, during the measurement process. Here, the second set is a part of the first set. The second set does not include the beams with directivity in the direction of the detected object.

The control circuit 12 can confirm whether there are objects in the space between the power transmission apparatus 1 and the plurality of power receiving apparatuses, when the second set is used for transmitting beams. If objects are no longer detected in the direction of the beams included in the first set, the control circuit 12 of the power transmission apparatus 1 can change the beams transmitted in each of the durations of the power transmission process according to the first set. For example, the control circuit 12 can check whether there are any objects in the direction where an object has been previously detected. If no objects are detected in the corresponding direction, the control circuit 12 can transmit beams using the first set again, instead of the second set which has a smaller number of beams. When the second set is used for transmission of wireless signals, the electromagnetic wave intensity at some of the power receiving apparatuses may become weaker. However, if the power transmission apparatus 1 can transmit combined wave beams to a greater number of directions using the first set, each of the power receiving apparatuses would receive power more sufficiently.

If objects have been detected in a plurality of directions, the control circuit 12 can check whether there are any objects in the plurality of directions. If no objects are detected in each of the plurality of directions, the control circuit 12 can transmit beams using the first set again, instead of the second set which has a smaller number of beams. Also, the control circuit 12 can check whether there are any objects in all of the directions corresponding to the beams defined in the first set, regardless of the number of directions where objects have been detected. This enables the detection of new intruding objects in the space between the power transmission apparatus and the plurality of power receiving apparatuses.

The control circuit 12 does not necessary have to use the first set to transmit beams to the plurality of power receiving apparatuses in the initial stage. For example, the control circuit 12 can use the second set with a smaller number of beams to transmit supply power, in the initial stage. If the control circuit 12 does not detect any objects, the control circuit 12 can use the first set with a greater number of beams to supply power in a later stage. During the detection process, the control circuit 12 can check whether there are any objects for the directions corresponding to the beams defined in the first set. Also, the control circuit 12 can check whether there are any objects for the directions corresponding to the beams defined in the second set, during the detection process.

If the control circuit 12 of the power transmission apparatus 1 determines that an object is in the direction of the transmitted beam, the control circuit 12 can change the transmitted beam to a beam with a higher directivity in the direction the object is not detected. Also, if the control circuit 12 of the power transmission apparatus 1 determines that an object is in the direction of the transmitted beam, the control circuit 12 can change the transmitted beam to a beam with a lower directivity in the direction where the object is detected.

Figure 15:
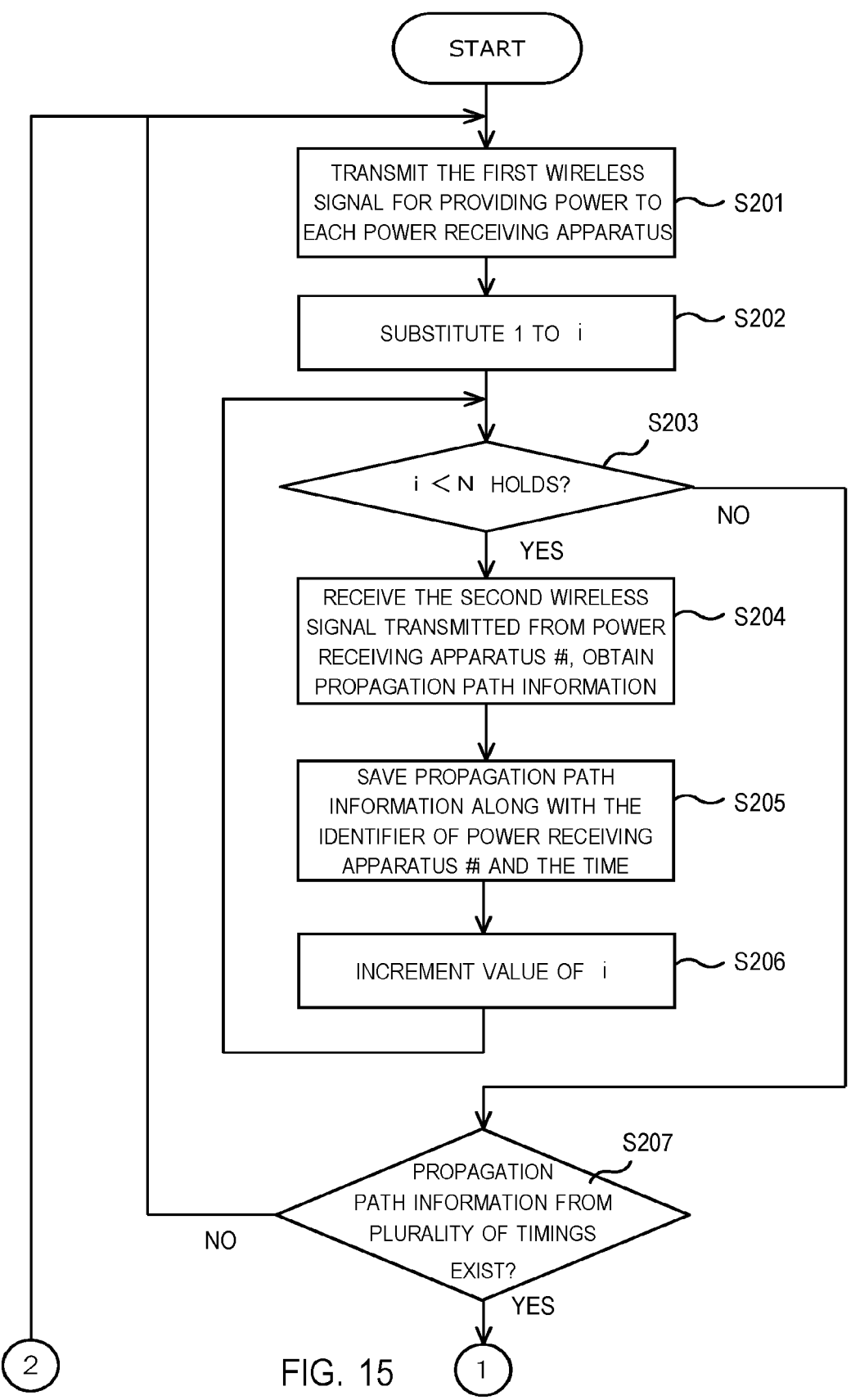
FIG. 15 is a flowchart presenting an example of processes executed by the wireless power transmission apparatus according to a second embodiment.
Figure 16:
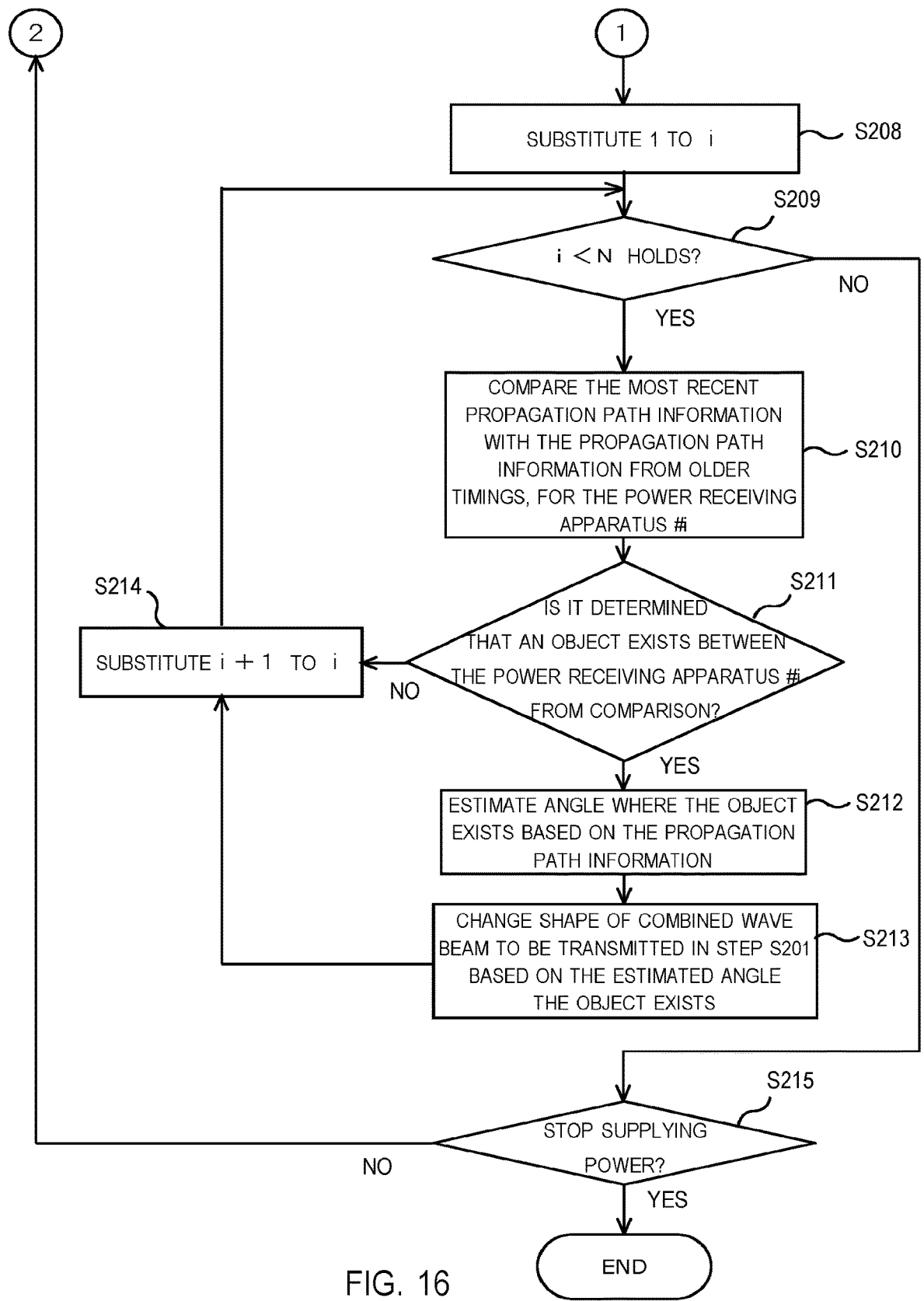
FIG. 16 is a flowchart presenting an example of processes executed by the wireless power transmission apparatus according to the second embodiment.

FIG. 15 and FIG. 16 include a flowchart presenting an example of processes executed by the power transmission apparatus according to a second embodiment. In the following, the processes are explained with reference to FIG. 15 and FIG. 16.

First, the power transmission apparatus 1 transmits the first wireless signal is to provide power to N power receiving apparatuses (step S201). Then, the control circuit 12 of the power transmission apparatus 1 substitutes the value 1 to the variable i (step S202). The number of the power receiving apparatus is stored in the variable i. Then, the control circuit 12 of the power transmission apparatus 1 determines whether the value of the variable i is smaller than the number of power receiving apparatuses N (step S203).

If the value of the variable i is smaller than the number of power receiving apparatuses N (YES in step S203), the power transmission apparatus 1 receives the second wireless signal transmitted from the power receiving apparatus #i and obtains the propagation path information (step S204). In step S204, the power transmission apparatus 1 can transmit control signals requiring the transmission of second wireless signals to the power receiving apparatus #i. The control circuit 12 of the power transmission apparatus 1 saves the propagation path information in the storage 13, along with the identifier of the power receiving apparatus #i and the time (step S205). Examples of the identifier include the MAC address, the serial number and the manufacturing number. However, the format of the identifier is not limited. Then, the control circuit 12 of the power transmission apparatus 1 increments the value of variable i (step S206). After the process of step S206 is executed, the process of step S203 is executed again. Depending on the result of step S203, the process which is executed branches.

If the control circuit 12 of the power transmission apparatus 1 determines that the value of the variable i is greater than the number of power receiving apparatuses N (NO in step S203), the control circuit 12 of the power transmission apparatus 1 confirms whether the propagation path information for a plurality of timings are stored in the storage 13 of the power transmission apparatus 1 (step S207). If the propagation path information for a plurality of timings is not saved in the storage 113 (NO in step S207), the process of step S201 and beyond are executed.

If the propagation path information for a plurality of timings is saved in the storage 13 (YES in step S207), the control circuit 12 of the power transmission apparatus 1 resets the value of the variable i to 1 (step S208). Then, the control circuit 12 of the power transmission apparatus 1 determines whether the value of the variable i is smaller than the number of power receiving apparatuses N (step S209).

If the value of the variable i is greater than the number of the power receiving apparatuses N (YES in step S209), the control circuit 12 of the power transmission apparatus 1 refers to the storage 13, comparing the most recent propagation path information with the propagation path information from older timings, for the power receiving apparatus #i (step S210). The propagation path information from older timings can be the propagation path information obtained at a specific timing. Also, the propagation path information from older timings can be the propagation path information obtained at a plurality of timings excluding the most recent timing. Also, the average value calculated from the propagation path information at the plurality of timings and the propagation path information at the most recent timing can be compared by the control circuit 12. The process executed in step S210 is described in the explanation for FIG. 4.

The control circuit 12 of the power transmission apparatus 1 determines whether there is an object in the propagation path between the power transmission apparatus 1 and the power receiving apparatus #i using the result of comparison in step S210 (step S211). If the control circuit 12 of the power transmission apparatus 1 determines that there is an object in the propagation path between the power transmission apparatus 1 and the power receiving apparatus #i (YES in step S211), based on the propagation path information saved in the storage 13, the control circuit 12 of the power transmission apparatus estimates the angle where the object exists (step S212). The angle where the object exists can be the angle of arrival for the second wireless signal estimated when it has been determined that an object exists in the propagation path. Also, the control circuit 12 of the power transmission apparatus 1 can use the angle of the power receiving apparatus #i calculated by the estimation of the angle of arrival for the second wireless signal, when objects do not exist in the propagation path.

Also, the control circuit 12 of the power transmission apparatus 1 can estimate the angle where the object exists by using other methods. If the control circuit 12 of the power transmission apparatus 1 determines that an object exists in the propagation path, the directivity of the array antenna 16 during the reception of the second wireless signal can be increased, for the sake of accurate estimation for the angle of arrival. Also, the reception period of the second wireless signal can be extended, to improve the accuracy of estimation.

Then, the control circuit 12 of the power transmission apparatus 1 changes the shape of the combined wave beam which is going to be used for supplying power to the power receiving apparatus #i in step S201, based on the estimated angle the object exists (step S213). The control circuit 12 of the power transmission apparatus 1 can refer to the storage 13 to select the combined wave beam with the lower gains in the angle where the object exists. If there is a plurality of combined wave beams with lower gains in the angle where the object exists, the combined wave beam with high directivity in the angle where the power receiving apparatus which needs to be charged with the highest priority exists can be selected by the control circuit 12.

In step S212, at least the phases or the amplitudes of the wireless signals provided to each antenna can be adjusted to change the directivity of the combined wave beam. Also, other processes such as modification of transmission power, duty ratio of the first wireless signal, ON/OFF timing of the first wireless signal and the frequency band can be executed together as well.

If the control circuit 12 of the power transmission apparatus 1 determines that an object does not exist in the propagation path between the power transmission apparatus 1 and the power receiving apparatus #1 (NO in step S211) or if the process of step S212 is executed, the control circuit 12 of the power transmission apparatus 1 increments the value of variable i (step S213). If the process of step S213 is executed, the process of step S209 is executed again. The process which is executed branches, depending on the result.

If the value of the variable i is smaller than the number of power receiving apparatuses N (NO in step S209), the control circuit 12 of the power transmission apparatus 1 determines whether the power transmission process needs to be stopped or not (step S215). If the power transmission process needs to be continued (NO in step S215), the power transmission apparatus 1 transmits the first wireless signal for supplying power to each power receiving apparatus (step S201). In step S201, the combined wave beam transmitted can be selected from a specific set of beams (for example, the timing diagrams 31 and 32 in FIG. 14), for each duration. Then, the processes beyond step S201 are executed by the power transmission apparatus 1. If the power transmission process needs to be stopped (YES in step S215), the power transmission apparatus 1 completes the processes of FIG. 15 and FIG. 16.

Third Embodiment

The power transmission apparatus according to the second embodiment transmitted combined wave beams with high directivity in the angles where each power receiving apparatus exists for the sake of efficient supply of wireless power. If a plurality of power receiving apparatuses exists within close angles, wireless power can be supplied per each group of power receiving apparatuses located within close angles observed from the power transmission apparatus. In the third embodiment, examples of processes different from the first and second embodiment are described. The configuration of the power transmission apparatus and the power receiving apparatus (wireless power transmission system) according to the third embodiment is similar to the first embodiment. Thus, in the following, the third embodiment is described, mainly focusing on the difference from the aforementioned first embodiment and the second embodiment.

Referring to FIG. 3, the power receiving apparatus 2A (power receiving apparatus #1) and the power receiving apparatus 2B (power receiving apparatus #2) are located in the clockwise direction (positive angle +θ) with respect to the broken line 41. On the other hand, power receiving apparatus 2C (power receiving apparatus #3) and the power receiving apparatus 2D (power receiving apparatus #4) are located in the anticlockwise direction (negative angle −θ) with respect to the broken line 41. Here, the power receiving apparatuses can be categorized into two groups during the power transmission process. The first group includes the power receiving apparatus 2A (power receiving apparatus #1) and the power receiving apparatus 2B (power receiving apparatus #2). The second group includes the power receiving apparatus 2C (power receiving apparatus #3) and the power receiving apparatus 2D (power receiving apparatus #4). Information on the grouping of the power receiving apparatuses, such as the first group and the second group can be saved in the storage 13 of the power transmission apparatus 1.

Figure 17:
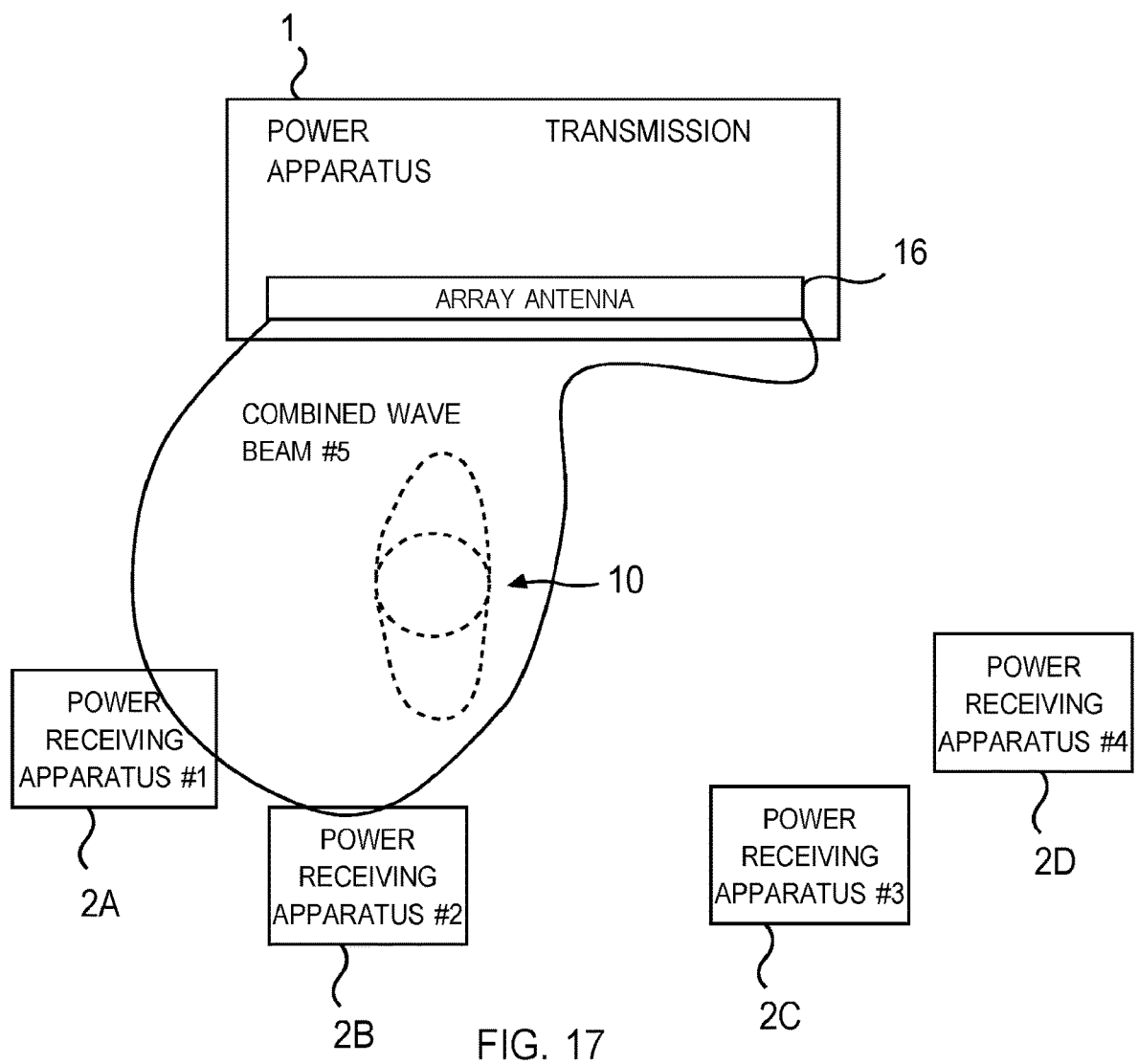
FIG. 17 is a plan view diagram illustrating an example of a combined wave beam of the first wireless signal with stronger directivity in the direction of a first group.

FIG. 17 is a plan view diagram illustrating an example of a combined wave beam #5 of the first wireless signal with stronger directivity in the direction of the first group. The power transmission apparatus 1 generates the combined wave beam #5 ensuring that the directivity in the angle between +$θ_1$ and +$θ_2$ in FIG. 3 are sufficiently high. By transmitting the combined wave beam #5, the power transmission apparatus 1 can supply power sufficiently to the power receiving apparatus 2A (power receiving apparatus #1) and the power receiving apparatus 2B (power receiving apparatus #2).

Figure 18:
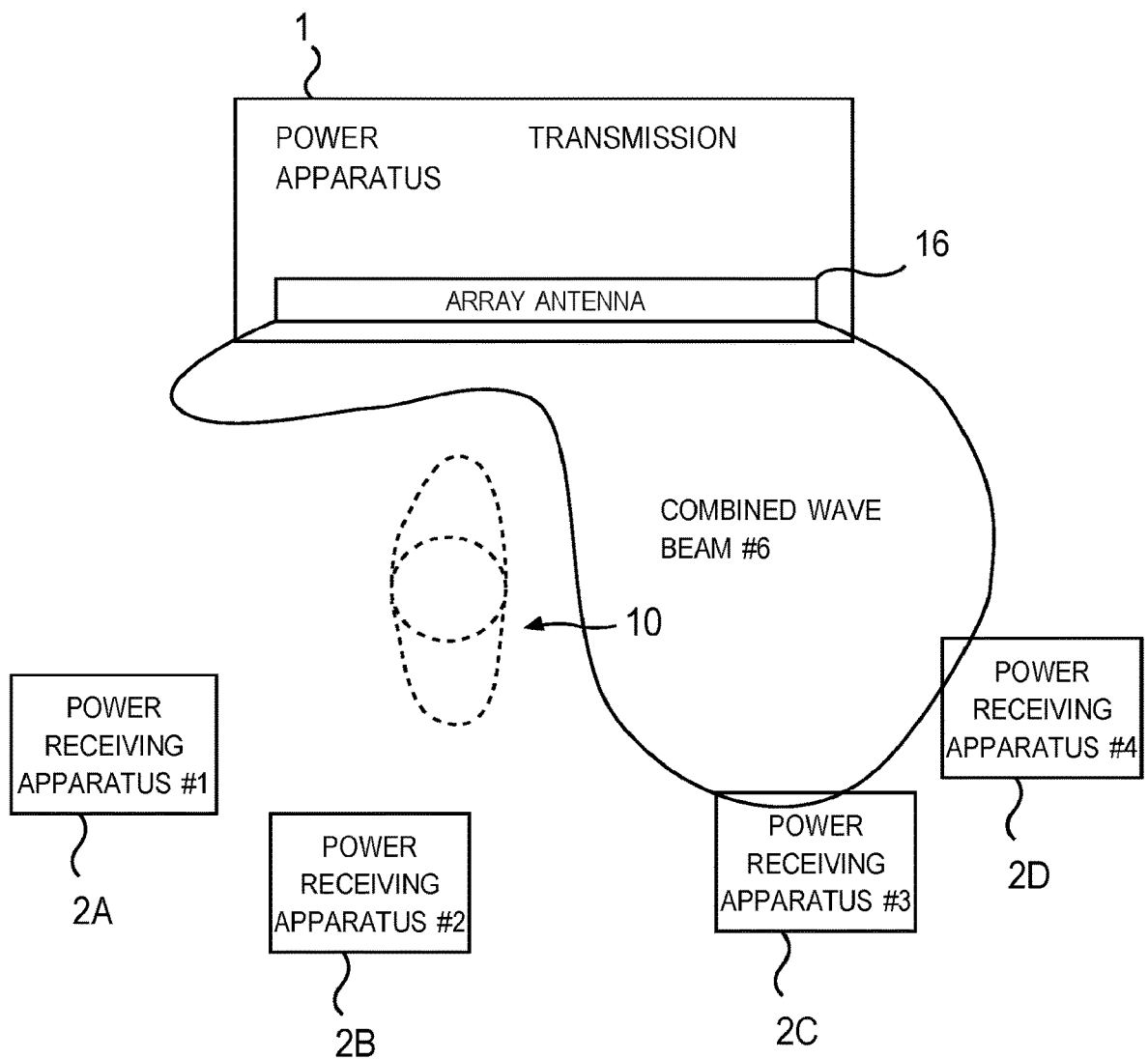
FIG. 18 is a plan view diagram illustrating an example of a combined wave beam of the first wireless signal with stronger directivity in the direction of a second group.

FIG. 18 is a plan view diagram illustrating an example of a combined wave beam #6 of the first wireless signal with stronger directivity in the direction of the second group. The power transmission apparatus 1 generates the combined wave beam #6 ensuring that the directivity in the angles between −$θ_3$ and −$θ_4$ in FIG. 3 are sufficiently high. By transmitting the combined wave beam #6, the power transmission apparatus 1 can supply power efficiently to the power receiving apparatus 2C (power receiving apparatus #3) and the power receiving apparatus 2D (power receiving apparatus #4).

Referring to FIG. 17, if the power transmission apparatus 1 transmits the combined wave beam #5, the human body 10 would be exposed to the electromagnetic wave of the combined wave beam #5. However, referring to FIG. 18, the combined wave beam #6 is not emitted to the direction of the human body 10, reducing the amount of exposure.

Information such as the transmission settings used for transmitting the combined wave beams #5 and #6 (for example, at least either the phases or the amplitudes of the wireless signals provided to each antenna), the angles each the directivity of each combined wave beam becomes higher and the angles the gains of each combined wave beam become lower can be saved in the storage 13 of the power transmission apparatus 1. Similar to the second embodiment, the control circuit 12 can select the combined wave beam to be transmitted based on the information stored in the storage 13 and the detection result of the human body (objects). Also, the control circuit 12 can select the combined wave beam to be transmitted based on information of the angles where the power receiving apparatuses which have high priorities for supplying power are located.

FIG. 19 includes a timing diagram 33 and a timing diagram 34. The timing diagram 33 corresponds to the case when an object (for example, the human body) is not detected in the propagation path between the power transmission apparatus 1 and the power receiving apparatus. The timing diagram 34 corresponds to the case when an object (for example, the human body) is detected in the propagation path between the power transmission apparatus 1 and the power receiving apparatus. The horizontal axes in the timing diagrams 33 and 34 represent the time, respectively.

In the timing diagrams 33 and 34, the power transmission apparatus 1 is executing the power transmission process and the measurement process alternately. The combined wave beams transmitted in each of the durations of the power transmission processes are predetermined. For example, the beams transmitted in each of the durations can be selected from a specific set of beams. Then, the selected beams can be transmitted according to a specific order.

In the timing diagram 33, the combined wave beam #5 is transmitted in the first duration. In the second duration, the combined wave beam #6 is transmitted. In the third duration, the combined wave beam #5 is transmitted. In the fourth duration, the combined wave beam #6 is transmitted. In the timing diagram 34, the combined wave beam #5 is transmitted during the first duration. In the second duration, the combined wave beam #6 is transmitted. However, during the measurement process executed in the period 34a, a human body 10 is detected in the propagation path between the power receiving apparatus #1 or the power receiving apparatus #2. Therefore, in the power transmission process immediately after the period 34a, the combined wave beam #6 is transmitted to ensure that the exposure of electromagnetic waves to the human body 10 is reduced. Also, during the measurement process executed in the period 34b, a human body 10 is detected in the propagation path between the power receiving apparatus #1 or the power receiving apparatus #2. Therefore, in the power transmission process immediately after the period 34b, the combined wave beam #6 is transmitted to ensure that the exposure of electromagnetic waves to the human body 10 is reduced.

Fourth Embodiment

In the fourth embodiment, examples of the processes which can be executed when the object is intruding into the propagation path between the power transmission apparatus and each of the power receiving apparatuses are described. The configuration of the power transmission apparatus and the power receiving apparatus according to the fourth embodiment is similar to the power transmission apparatus and the power receiving apparatus according to the first embodiment, respectively.

FIG. 20 to FIG. 24 illustrate some examples of the shapes of the combined wave beams changed according to the movement of the pedestrian. In FIG. 20 to FIG. 24, the human body 10 is a pedestrian walking from the left side to the right side, in the space between the power transmission apparatus 1 and each of the power receiving apparatuses. In the following, the executed processes are described with reference to FIG. 20 to FIG. 24. In the storage 13 of the power transmission apparatus 1, the transmission settings (at least the information of the phases and the amplitudes of the wireless signals provided to each antenna when each combined wave beam is transmitted) and the angles where the gains of each combined wave beam become lower can be saved. The control circuit 12 of the power transmission apparatus 1 refers to the aforementioned information saved in the storage 13 to specify the combined wave beam to transmit.

Figure 20:
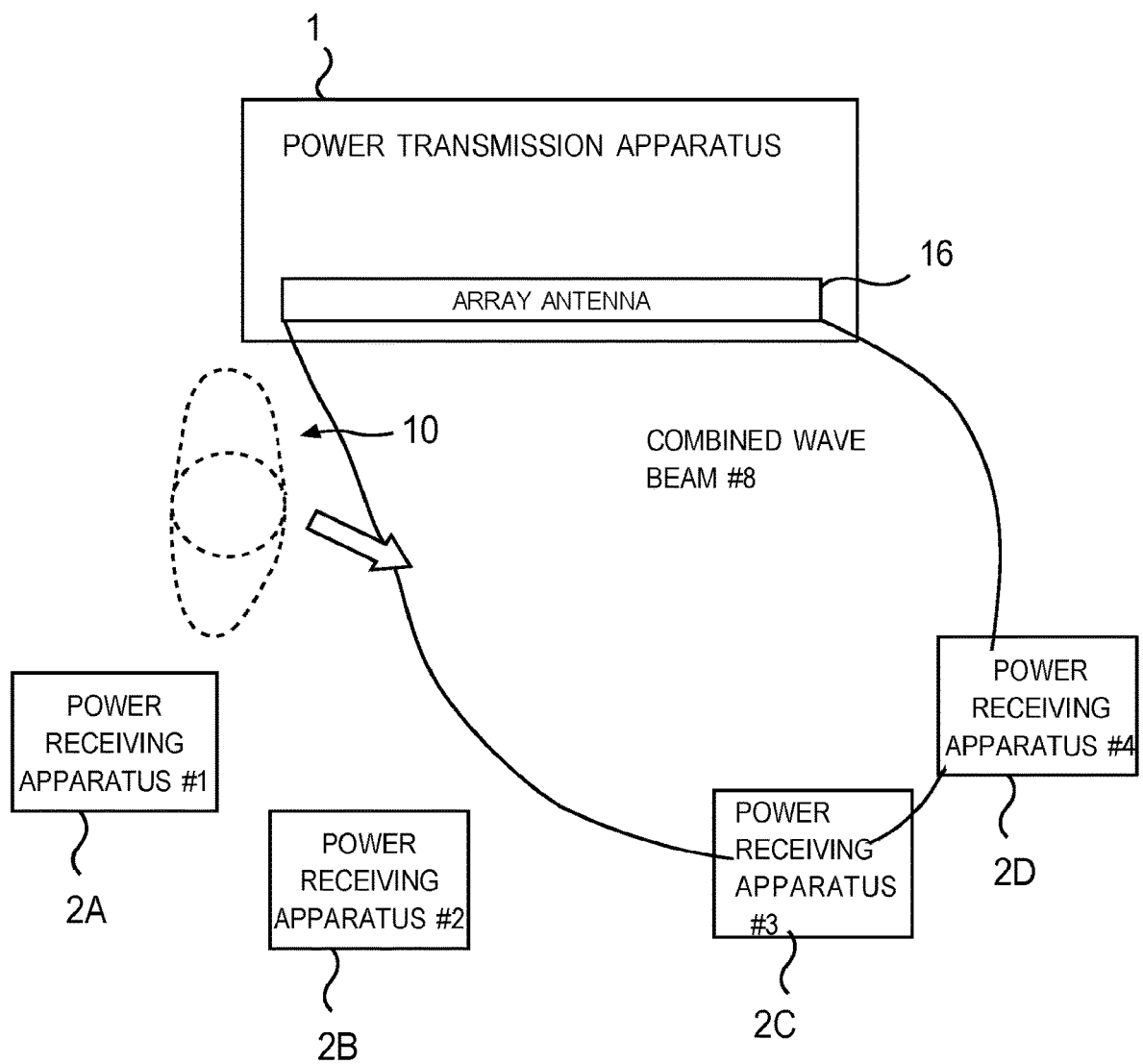
FIG. 20 is a plan view diagram illustrating an example of the shape of combined wave beam changed according to the movement of the pedestrian.

First, the power transmission apparatus 1 receives the second wireless signal transmitted from the power receiving apparatus 2A (power receiving apparatus #1) and the control circuit 12 detects that a human body 10 exists in the angle $+\theta_1$ of FIG. 3 during the measurement process (FIG. 20). Therefore, the control circuit 12 of the power transmission apparatus 1 modifies the transmission settings of the first wireless signal and transmits the combined wave beam #8 with higher directivity of the electromagnetic waves set to a different direction from the angle $+\theta_1$.

Figure 21:
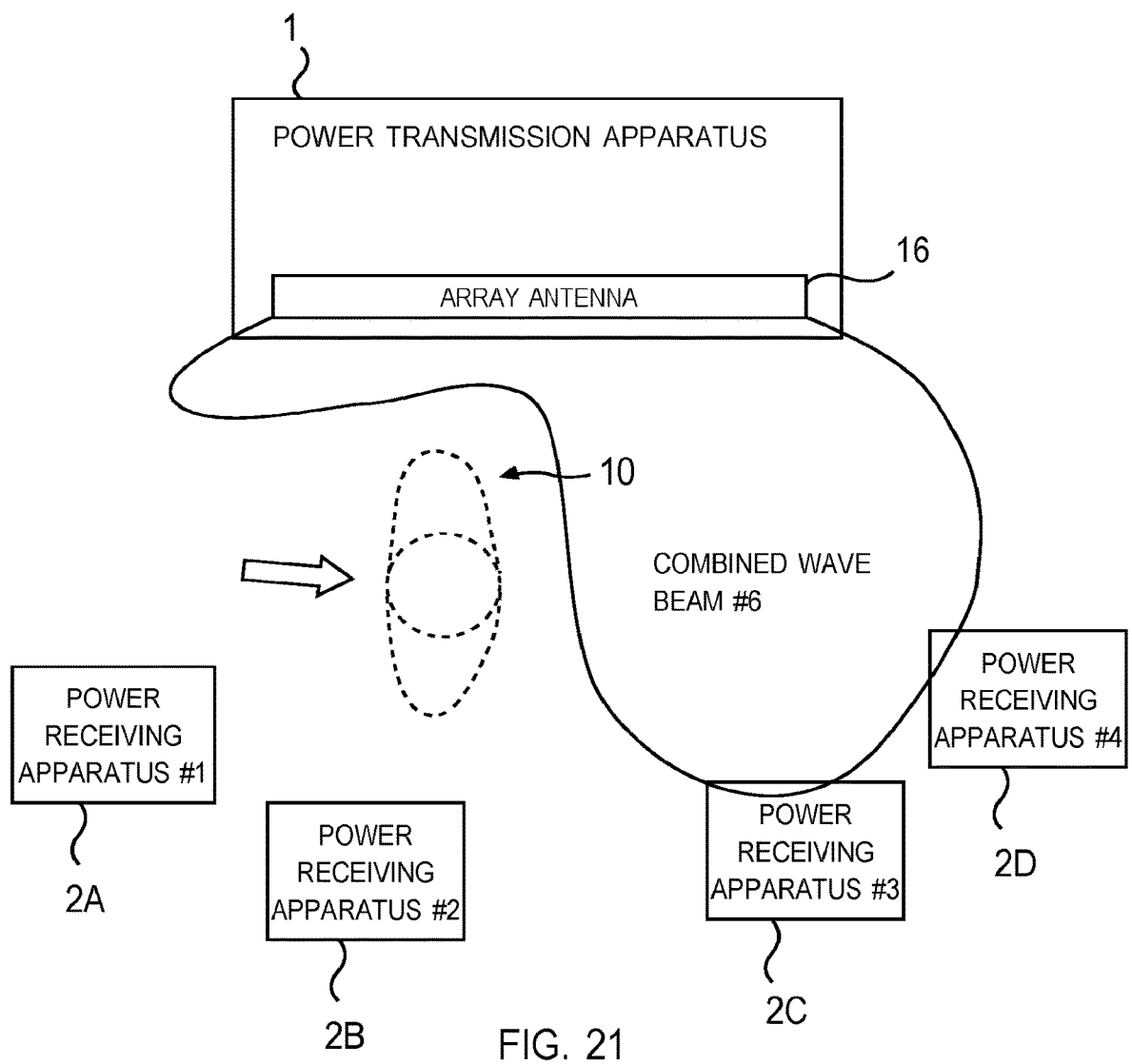
FIG. 21 is a plan view diagram illustrating an example of the shape of combined wave beam changed according to the movement of the pedestrian.

Next, the power transmission apparatus 1 receives the second wireless signal transmitted from the power receiving apparatus 2B (power receiving apparatus #2) and the control circuit 12 detects that there is a human body 10 in the angle $+\theta_2$ of FIG. 3, during the measurement process (FIG. 21). Therefore, the control circuit 12 of the power transmission apparatus 1 modifies the transmission settings of the first wireless signal and transmits a combined wave beam #6 with higher directivity of the electromagnetic waves set to a different direction from the angle $+\theta_2$.

Figure 22:
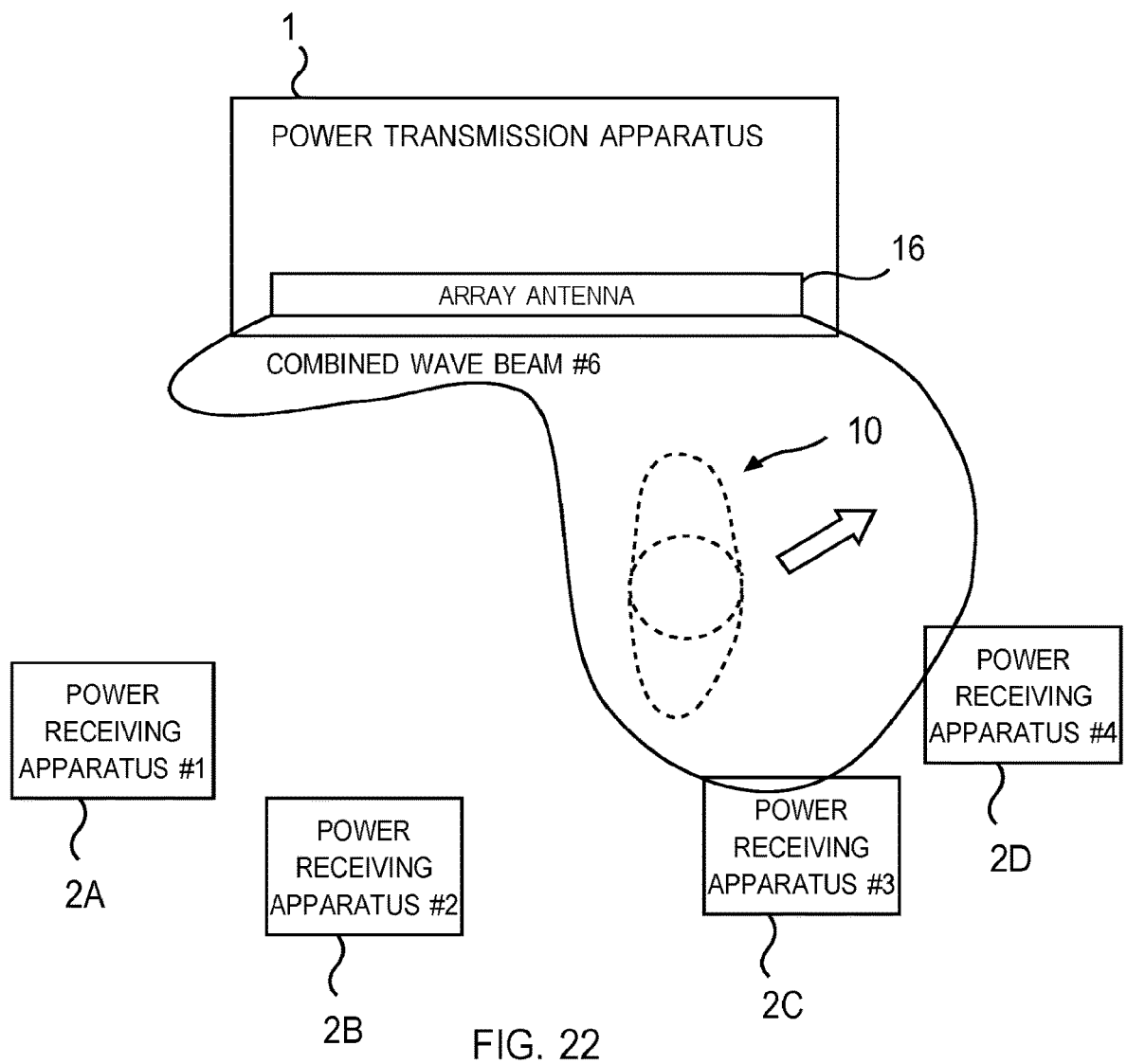
FIG. 22 is a plan view diagram illustrating an example of a case when the timing when the shape of the combined wave beam shape is changed is delayed.
Figure 23:
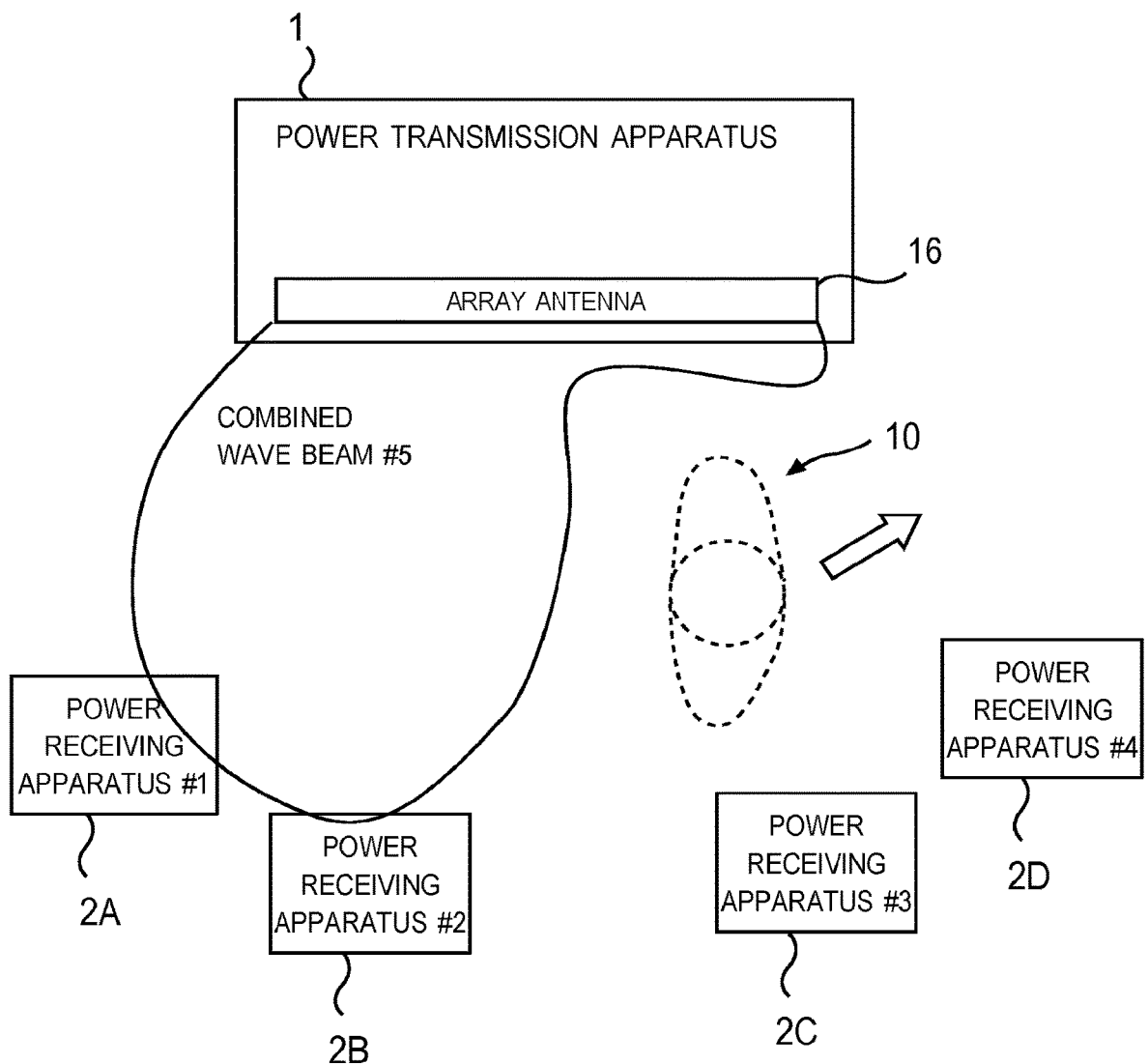
FIG. 23 is a plan view diagram illustrating an example of the shape of combined wave beam changed according to the movement of the pedestrian.

The power transmission apparatus 1 can transmit the combined wave beam #5 of FIG. 23 instead of the combined wave beam #6 of FIG. 21 when it is detected that the human body 10 exists in the angle $-\theta_3$ of FIG. 3 during the measurement process. However, if the directivity of the combined wave beam of the first wireless signal is changed after the detection of the human body 10 at angle $+\theta_3$, as illustrated in FIG. 22, there would be a duration when the human body 10 is located in the region where the combined wave beam #6 is emitted. Depending on the length of the duration, the exposure of electromagnetic waves to the human body 10 may increase.

Thus, the control circuit 12 of the transmission apparatus 1 can determine that the human body 10 is moving from the left side to the right side in the plan view diagram, based on the detection results in FIG. 20 and FIG. 21. The transmission apparatus 1 transmits the combined wave beam #5 of FIG. 23, instead of the combined wave beam #6 of FIG. 21, before the control circuit 12 detects the human body 10 in angle $-\theta_3$. Therefore, the exposure of the human body 10 to electromagnetic waves can be reduced. The control circuit 12 according to the fifth embodiment determines the direction the object is moving based on the previous detection results. Then, the control circuit 12 can modify the directivity of the first wireless signal (combined wave beam) based on the detection results.

In the following example, the control circuit 12 determined that the object is moving to a certain direction when the object (the human body 10) is detected in adjacent angles $+\theta_1$ and $+\theta_2$ successively. However, the control circuit 12 can be determine that the object (the human body 10) is moving from the left side to the right side of the plan view diagram of FIG. 3 when the object (the human body 10) is detected in the angles, $+\theta_1$, $+\theta_2$ and $-\theta_3$, successively. Thus, the control circuit 12 can estimate a plurality of angles the second wireless signal is arriving. If the object is detected in angles which are adjacent in the same rotational direction, the control circuit 12 can estimate the direction the object is moving in the corresponding rotational direction. Then, the control circuit 12 can change the transmitted beam to a beam with a lower gain in the direction of movement, compared to the previously transmitted beam, without waiting until the object is detected in the next timing. The number of timings when the object is consecutively detected in angles which are adjacent in the same rotational direction can be used as the criteria for determining whether the object is moving to a certain direction. Any threshold value can be used for comparing with the above number of timings.

Figure 24:
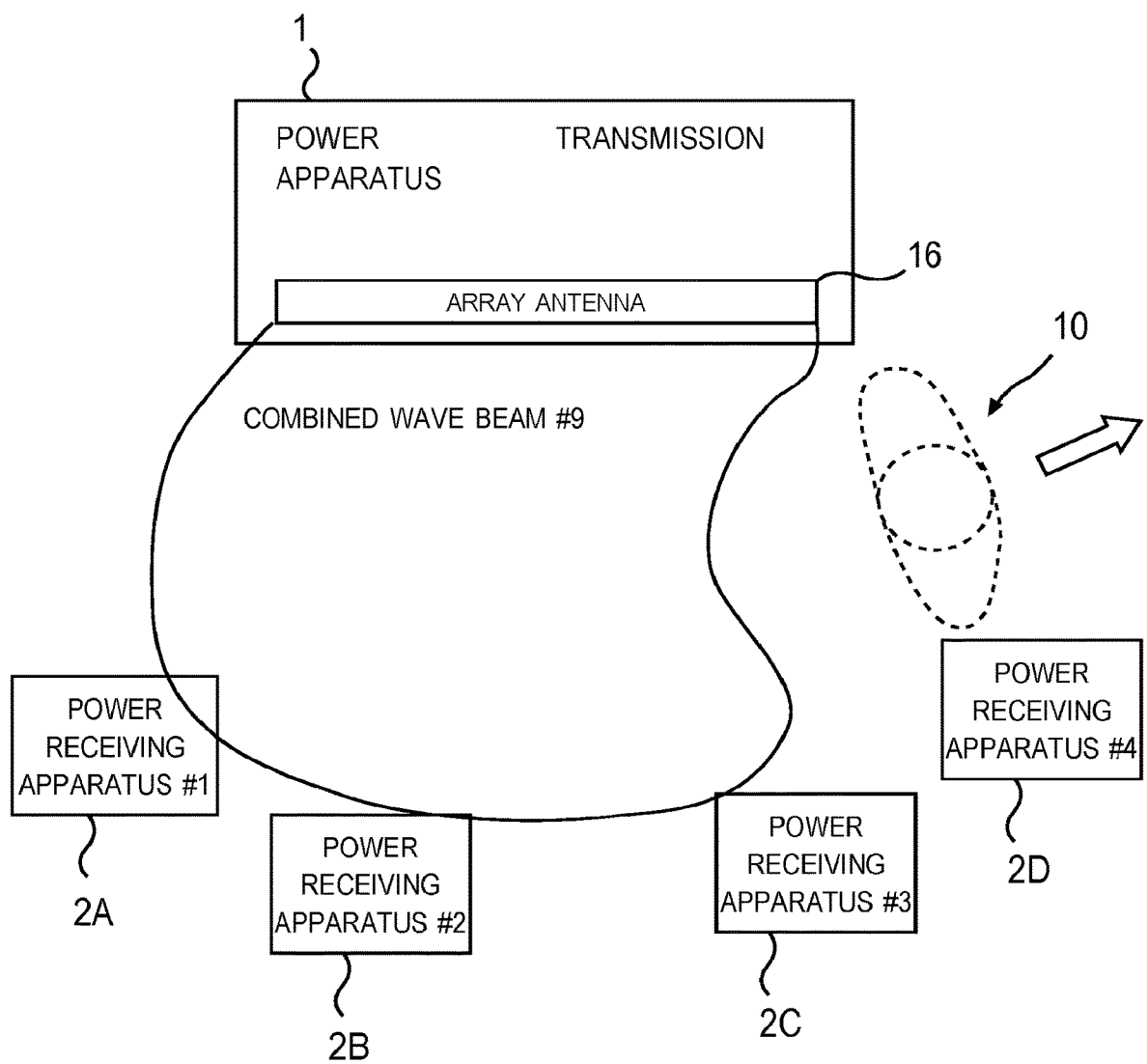
FIG. 24 is a plan view diagram illustrating an example of the shape of combined wave beam changed according to the movement of the pedestrian.

By executing the aforementioned process of determining the direction the object (the human body 10) is moving, the power transmission apparatus 1 can transmit the combined wave beam #9 when the human body 10 is in the angle $-\theta_4$ of FIG. 3 (FIG. 24). Thereby, efficient wireless transmission of power to the power receiving apparatuses 2A to 2C (the power receiving apparatuses #1 to #3) can be executed while reducing the exposure of electromagnetic waves to the human body 10.

By using the wireless transmission system according to the above embodiments, both the safety and efficient supply of power to apparatuses can be realized during the wireless power transmission process.

Fifth Embodiment

In each of the above embodiments, the power transmission apparatus was detecting objects such as the human body located in the propagation paths between the power transmission apparatus and each of the power receiving apparatuses by receiving the second wireless signals transmitted from the power receiving apparatuses. However, the power transmission apparatus can detect objects such as the human body located in the propagation paths between the power transmission apparatus and each of the power receiving apparatuses by using other methods.

FIG. 25 is a block diagram illustrating an example configuration of a wireless power transmission system according to a fifth embodiment. The power transmission apparatus 1 in FIG. 25 includes a sensor circuit 17. Examples of the sensor circuit 17 include infrared radiation sensors, ultrasound sensors, ToF sensors and various image sensors. The power transmission apparatus 1 can detect objects (for example, the human body 10) in the surrounding environment based on the output signals of the sensors provided from the sensor circuit 17. If the object detected by the sensor is located in the propagation paths between the power transmission apparatus 1 and each of the power receiving apparatuses the control circuit 12 of the power transmission apparatus 1 can change the shape of the transmitted combined wave beam, using methods which are described in the above embodiments. Also, if the object detected by the sensor is located in regions where the electromagnetic field strength of the first wireless signal transmitted from the array antenna is equal to or greater than the threshold value, the control circuit 12 of the power transmission apparatus can change the shape of the transmitted combined wave beam, using methods which are described in the above embodiments.

Also, the control circuit 12 of the power transmission apparatus 1 can use both the sensor circuit 17 and the reception results of the second wireless signal for detecting objects in the propagation path. The control circuit 12 of the power transmission apparatus 1 can determine whether an object exists or not by using the sensor. Then, the control circuit 12 of the power transmission apparatus 1 can determine the location of the object or execute channel estimation by using the wireless signals. Other than the fact a sensor circuit 17 is implemented, the configuration of the power transmission apparatus according to the fifth embodiment is similar to the power transmission apparatus according to the first embodiment.

Thus, a sensor circuit 17 can be configured to detect the object. The control circuit 12 can be configured to detect the object in the direction of the beam based on additionally a signal of the sensor circuit, and change the shape of the beam by controlling at least the amplitude or the phase of the first wireless signal provided to the plurality of antennas.

By using the wireless power transmission system according to the fifth embodiment, the location of objects such as the human body can be executed with greater accuracy. Thus, potential risks during wireless power supply can be further reduced.

Sixth Embodiment

In the wireless power transmission system according to the above embodiments, the second wireless signal used by the power transmission apparatus to detect objects were transmitted by a plurality of power receiving apparatuses. However, the power transmission apparatus can detect objects by receiving second wireless signals transmitted from wireless communication apparatuses other than the power receiving apparatuses. By placing the wireless communication apparatuses in angles where the power receiving apparatuses are not placed, the objects can be detected more accurately by the power transmission apparatus. The configurations of the power transmission apparatus and the power receiving apparatuses according to the sixth embodiment are similar to the first embodiment.

Figure 26:
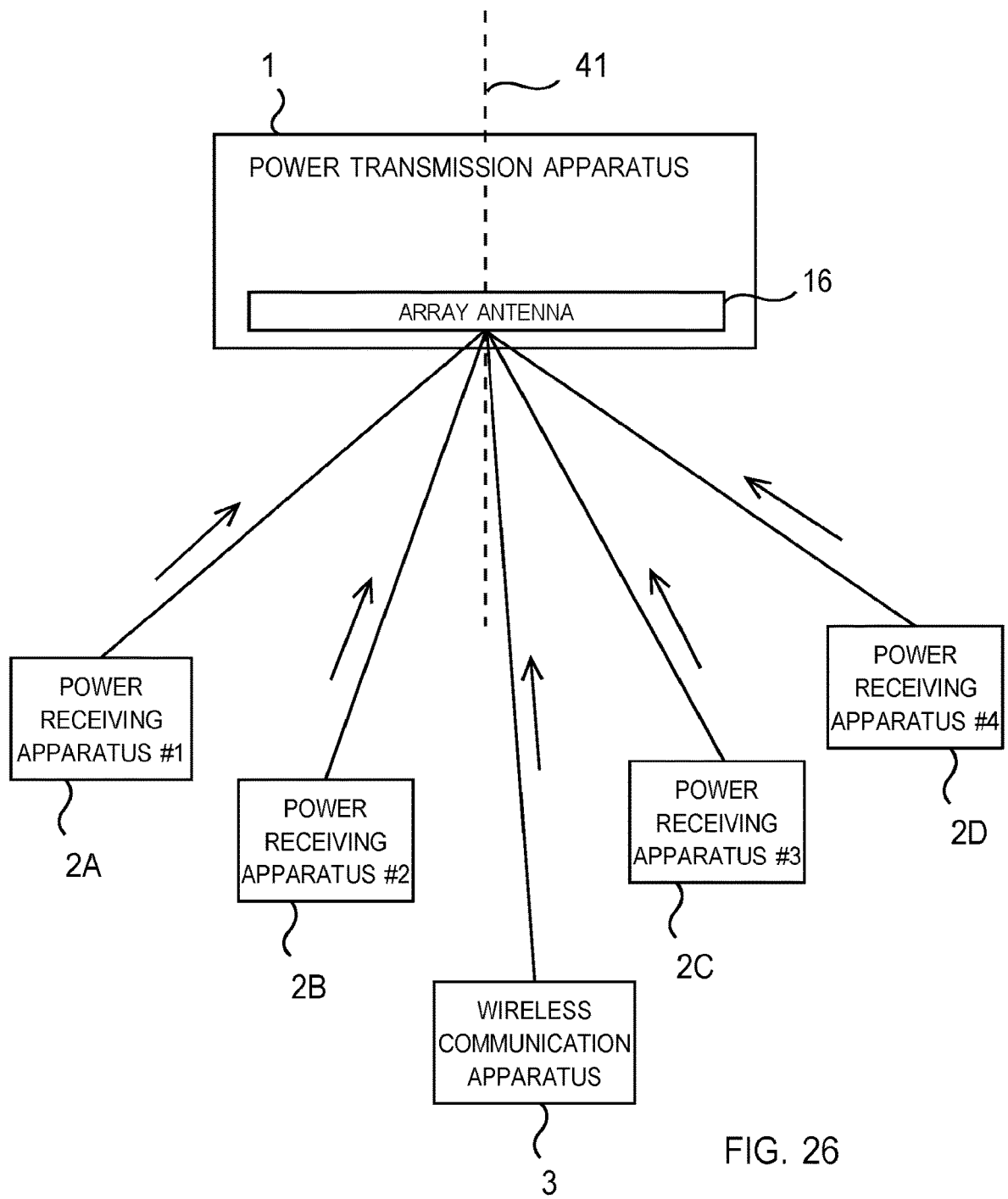
FIG. 26 is a plan view diagram illustrating an example configuration of a wireless power transmission system according to a sixth embodiment.

FIG. 26 is a plan view diagram illustrating an example configuration of a wireless power transmission system according to a sixth embodiment. The wireless power transmission system of FIG. 26 includes a power transmission apparatus 1, power receiving apparatuses 2A to 2D (power receiving apparatuses #1 to #4) and a wireless communication apparatus 3. The wireless communication apparatus 3 includes some of the components in the power receiving apparatus 2A of FIG. 1. For example, the wireless communication apparatus 3 includes the receiving circuit 21a, the antenna 21b, the transmission circuit 22a, the antenna 22b and the control circuit 23. The wireless communication apparatus 3 receives the control signal transmitted from the power transmission apparatus 1. Then, the wireless communication apparatus 3 transmits the second wireless signal according to the instructions in the control signal.

In the wireless power transmission system according to the sixth embodiment, it is possible to detect objects which exist in the angles where the power receiving apparatuses are not installed, observed from the power transmission apparatus 1. Thereby, even in cases when the number of power receiving apparatuses is small, it is possible to detect the movement of objects such as the human body with greater accuracy.

The terms used in the embodiments should be interpreted broadly. For example, the term "processor" may include a general-purpose processor, a central processor (CPU), a microprocessor, a digital signal processor (DSP), a controller, a micro-controller, and a state machine. Depending on situations, the "processor" may indicate an application specific integrated circuit, a field programmable gate array (FPGA), a programmable logic circuit (PLD), and the like. The "processor" may indicate a combination of processing apparatuses such as a plurality of microprocessors, a combination of a DSP and a microprocessor, and one or more microprocessors cooperating with a DSP core.

As another example, the term "memory" may include any electronic component capable of storing electronic information. The "memory" can indicate a random access memory (RAM), a read only memory (ROM), a programmable read only memory (PROM), an erasable programmable read only memory (EPROM), an electrically erasable PROM (EEPROM), a nonvolatile random access memory (NVRAM), a flash memory, and a magnetic or optical data storage. The data saved in the apparatuses mentioned above can be read by a processor. If the processor performs reads, writes or both reads and writes to the memory, the memory can be considered to be communicating electrically with the processor. The memory can be integrated with the processor. In such cases as well, the memory can be considered as communicating electrically with the processor.

The term "storage apparatus" or "storage" may include any apparatus that can store data using magnetic technology, optical technology, or nonvolatile memory. For example, the storage can be a HDD, an optical disk, a SSD, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus, comprising:
a plurality of antennas;
a power transmission circuit configured to transmit a beam of a first wireless signal from the plurality of antennas;
a measuring circuit configured to receive a second wireless signal including propagation path information transmitted by at least one power receiving apparatus; and
a control circuit configured to: detect an object located between the plurality of antennas and the least one power receiving apparatus in a direction of the beam based on the second wireless signal received at a plurality of timings; and change a shape of the beam in relation to the detected object based on the propagation path information by controlling at least either an amplitude or a phase of the first wireless signal provided to each antenna in the plurality of antennas.

2. The electronic apparatus of claim 1, wherein
the control circuit is configured to detect the object in the direction of the beam based on at least a time domain waveform or a frequency domain waveform of the second wireless signal received at the plurality of timings.

3. The electronic apparatus of claim 1, wherein
the control circuit is configured to reduce a gain of the beam in a direction the object is detected.

4. The electronic apparatus of claim 1, wherein
the control circuit is configured to increase a gain of the beam in a direction the object is not detected.

5. The electronic apparatus of claim 1, wherein
the control circuit is configured to: receive the second wireless signal from a plurality of angles; determine that the object is moving in a certain direction based on the fact that the object is detected in angles which are adjacent with respect to a rotational direction at a plurality of timings; and reduce a gain of the beam in a direction the object is moving.

6. The electronic apparatus of claim 1, wherein
the control circuit is configured to select the beam which is transmitted from a predetermined set of beams.

7. The electronic apparatus of claim 1, wherein
the control circuit is configured to reduce at least a transmission power or a duty ratio of the first wireless signal when the object is detected in the direction of the beam.

8. The electronic apparatus of claim 1, wherein
the control circuit is configured to execute a power transmission process and a measurement process alternately, wherein
the power transmission circuit is configured to transmit the beam during the power transmission process, and
the measuring circuit is configured to receive the second wireless signal to detect the object in the direction of the beam and the control circuit is configured to change the shape of the beam by controlling at least the amplitude or the phase of the first wireless signal provided to the plurality of antennas during the measurement process.

9. The electronic apparatus of claim 8, wherein
the control circuit is configured to change a directivity of the transmitted beam at each of the power transmission processes using a first set of beams including a plurality of beams, each of the plurality of beams having different directivities.

10. The electronic apparatus of claim 9, wherein
the control circuit is configured to detect the object in directions of at least either one of the beams included in the first set and change the directivity of the transmitted beam at each of the power transmission processes, using a second set which is part of the first set, the second set not including the beams with directivity in the direction of the detected object.

11. The electronic apparatus of claim 10, wherein
the control circuit is configured to confirm that the object is no longer detected in the directions of at least either one of the beams included in the first set and change the directivity of the transmitted beam at each of the power transmission processes, using the first set.

12. The electronic apparatus of claim 1, wherein
the control circuit is configured to detect the object and determine the direction of the object after at least either increasing the directivity of the plurality of antennas during reception or extending a reception period of the second wireless signal.

13. The electronic apparatus of claim 1, further comprising:
a sensor circuit configured to detect the object, wherein the control circuit is configured to detect the object in the direction of the beam based on additionally a signal of the sensor circuit, and change the shape of the beam by controlling at least the amplitude or the phase of the first wireless signal provided to the plurality of antennas.

14. A system comprising:
an electronic apparatus configured to transmit a beam of a first wireless signal from a plurality of antennas;
a power receiving apparatus configured to transmit a second wireless signal and receive power supplied by the beam of the first wireless signal; and
said electronic apparatus further configured to receive the second wireless signal from the plurality of antennas, detect an object located between the electronic apparatus and the power receiving apparatus in a direction of the beam based the second wireless signal received at the plurality of timings, and change a shape of the beam in relation to the object based on the propagation path information by controlling at least either an amplitude or a phase of the first wireless signal provided to each antenna of the plurality of antennas.

15. The system of claim 14, further comprising:
a wireless communication apparatus configured to transmit the second wireless signal.

16. A method comprising:
a power transmission apparatus transmitting a beam of a first wireless signal from a plurality of antennas;
a power receiving apparatus receiving power supplied by the beam of the first wireless signal;
the power receiving apparatus transmitting a second wireless signal;
the power transmission apparatus receiving the second wireless signal with the plurality of antennas;
the power transmission apparatus detecting an object located between the plurality of antennas and the power receiving apparatus in a direction of the beam based on the second wireless signal received at the plurality of timings;
the power transmission apparatus changing a shape of the beam in relation to the detected object based on the propagation path information by controlling at least either an amplitude or a phase of the first wireless signal provided to each antenna of the plurality of antennas.

17. The method of claim 16, further comprising:
a wireless communication apparatus transmitting the second wireless signal, the wireless communication apparatus being provided separately from the power transmission apparatus and the power receiving apparatus.

18. The electronic apparatus of claim 1, wherein, wherein the measuring circuit receives the second wireless signal transmitted from a wireless communication apparatus which does not receive power transmission by the first wireless signal from the power transmission circuit.

19. The electronic apparatus of claim 1, wherein
the power transmission circuit is configured to transmit a third wireless signal for data communication with the plurality of antennas; and
the power receiving apparatus receives the third wireless signal and is a target to receive power transmission by the beam of the first wireless signal.

20. The system of claim 14, wherein
the electronic apparatus is configured to transmit a third wireless signal for data communication with the plurality of antennas; and
the power receiving apparatus is configured to receive the third wireless signal and transmit the second wireless signal.

21. The method of claim 16, wherein
the power transmission apparatus is configured to transmit a third wireless signal for data communication with the plurality of antennas; and
the power receiving apparatus is configured to receive the third wireless signal and transmit the second wireless signal.

22. The electronic apparatus of claim 1, wherein
the measuring circuit is configured to receive the second wireless signal with the plurality of antennas.

23. The electronic apparatus of claim 1, wherein
the control circuit is configured to detect the object located between the plurality of antennas and the least one power receiving apparatus in the direction of the beam based on said propagation path information including at least one of time domain waveforms, amplitudes, phases, frequency domain waveforms, incoming directions and channel matrices of the second wireless signal received at the plurality of timings.

24. The system of claim 1, wherein
the control circuit executes a process including at least either reduction of a transmission power of the first wireless signal or reduction of a duty ratio of the first wireless signal, when it is determined that the object is present.

25. The method of claim 16, wherein
the power transmission apparatus executes a process including at least either reduction of a transmission power of the first wireless signal or reduction of a duty ratio of the first wireless signal, when it is determined that the object is present.

* * * * *